US008683070B2

(12) United States Patent
Gelter et al.

(10) Patent No.: US 8,683,070 B2
(45) Date of Patent: Mar. 25, 2014

(54) STREAM IDENTIFIER HASH TABLE

(75) Inventors: Aaron Gelter, West Jordan, UT (US); Brian Parker, West Valley City, UT (US); Robert Boatright, Sandy, UT (US); Jeffrey L. Hutchings, Lehi, UT (US)

(73) Assignee: Harman International Industries, Incorporated, Stamford, CT (US)

( * ) Notice: Subject to any disclaimer, the term of this patent is extended or adjusted under 35 U.S.C. 154(b) by 166 days.

(21) Appl. No.: 13/023,989

(22) Filed: Feb. 9, 2011

(65) Prior Publication Data

US 2011/0231565 A1    Sep. 22, 2011

Related U.S. Application Data

(60) Provisional application No. 61/314,263, filed on Mar. 16, 2010.

(51) Int. Cl.
G06F 15/16 (2006.01)

(52) U.S. Cl.
USPC .............. 709/231; 711/157; 380/46; 725/105

(58) Field of Classification Search
USPC ......................................................... 709/231
See application file for complete search history.

(56) References Cited

U.S. PATENT DOCUMENTS

| 6,925,085 | B1 * | 8/2005 | Krishna et al. | 370/395.32 |
|---|---|---|---|---|
| 7,398,362 | B1 * | 7/2008 | Tischler | 711/157 |
| 7,627,116 | B2 * | 12/2009 | Yanovsky | 380/46 |
| 2003/0086442 | A1 | 5/2003 | Reynolds et al. | 370/503 |
| 2004/0220975 | A1 * | 11/2004 | Carpentier et al. | 707/200 |
| 2005/0210523 | A1 * | 9/2005 | Parnell et al. | 725/97 |
| 2007/0074256 | A1 | 3/2007 | Jung et al. | |
| 2007/0280277 | A1 | 12/2007 | Lund | 370/412 |
| 2008/0019398 | A1 | 1/2008 | Genossar et al. | 370/498 |
| 2008/0086755 | A1 * | 4/2008 | Darnell et al. | 725/105 |
| 2009/0274154 | A1 | 11/2009 | Kopelman et al. | 370/395.32 |

OTHER PUBLICATIONS

U.S. Appl. No. 13/024,016, filed Feb. 9, 2011, Gelter et al.
U.S. Appl. No. 13/024,008, filed Feb. 9, 2011, Gelter et al.
U.S. Appl. No. 12/874,836, filed Sep. 2, 2010, Gelter et al.
International Search Report, dated Jun. 15, 2011, pp. 1-5, International Patent Application No. PCT/US2011/028335, European Patent Office, The Netherlands.
Written Opinion, dated Jun. 15, 2011, pp. 1-9, International Patent Application No. PCT/US2011/028335, European Patent Office, The Netherlands.

(Continued)

Primary Examiner — Hua Fan
(74) Attorney, Agent, or Firm — Alleman Hall McCoy Russell & Tuttle LLP

(57) ABSTRACT

A system may route media stream samples in time-stamped packets to a media interface. The system may determine a hash value from a stream identifier that identifies a source media stream corresponding to the media stream samples. The hash value may be determined based on a combination of a first portion of the stream identifier and a second portion of the stream identifier. The system may determine whether the stream identifier identifies a subscribed media stream by looking up the hash value in a hash table. The system may route the media stream samples to a media interface if source media stream is a subscribed media stream.

18 Claims, 11 Drawing Sheets

(56) References Cited

OTHER PUBLICATIONS

Chae, Jong Kwon et al., Adaptive Inter-Media Synchronization for Multiple Session-based Uncompressed HD Media Transport, dated 2007, pp. 1-11, vol. 6777, SPIE.

Garner, Geoffrey et al., IEEE 802.1 AVB and Its Application in Carrier-Grade Ethernet, dated Dec. 2007, pp. 126-134, IEEE Communications Magazine.

Subrahmanyan, R., Timing Recovery for IEEE 1588 Applications in Telecommunications, dated Jun. 2009, pp. 1858-1868, vol. 58, No. 6, IEEE.

IEEE P1722TM/D2.2 Draft Standard for Layer 2 Transport Protocol for Time Sensitive Applications in a Bridged Local Area Network, dated Mar. 2010, pp. 1-61, IEEE.

IEEE P1722™/D2.2 Draft Standard for Layer 2 Transport Protocol for Time Sensitive Applications in a Bridged Local Area Network, dated Sep. 2010, pp. 1-32, IEEE.

Boatright, Robert, Understanding IEEE's New Audio Video Bridging Standards, dated May 2009, pp. 1-5, Embedded Systems Design.

Office Action, dated Apr. 2, 2013, pp. 1-20, U.S. Appl. No. 13/024,016, U.S. Patent and Trademark Office, Alexandria, Virginia.

\* cited by examiner

STREAM IDENTIFIER HASH TABLE

PRIORITY CLAIM

This application claims priority under 35 U.S.C. §119(e) to U.S. Provisional Application No. 61/314,263, entitled "AUDIO/VIDEO PACKET MANAGEMENT SYSTEM," and filed Mar. 16, 2010, which is incorporated by reference.

BACKGROUND OF THE INVENTION

1. Technical Field

This application relates to media streams and, in particular, to receiving media streams.

2. Related Art

Audio/video media streams may be transmitted from a transmitter to a receiver. The transmitter may encapsulate samples of a media stream in packets, and transmit the packets to the receiver. The packets may be isochronous packets.

SUMMARY

A system may route media stream samples in time-stamped packets to a media interface. The media stream samples may include samples of audio, video, or a combination of both. The media stream samples may include samples of one or more source streams. The system may be implemented as a device, such as a FPGA (field programmable gate array) or a combination of devices. The system may include, for example, a stream identifier filter and a microcode engine. The stream identifier filter may determine whether a stream identifier corresponding to the media stream samples identifies a subscribed media stream. Subscribed media streams are streams to be generated by the system. The steam identifier filter may determine whether the stream identifier identifies a subscribed media stream by determining a hash value and looking up the hash value in a hash table. The stream identifier filter may determine the hash value based on a combination of a first portion of the stream identifier and a second portion of the stream identifier, such as a logical exclusive OR of a first half of the stream identifier with a second half of the stream identifier. The microcode engine may route the media stream samples included in the time-stamped packets to the media interface in response to a determination by the stream identifier filter that the media stream samples are for a subscribed media stream.

One interesting aspect is that the media interface may generate one or more media streams from the media stream samples. Another interesting aspect is that the system may include multiple media interfaces, where each one of media interfaces may generate one or more media streams from the media stream samples of multiple subscribed source streams. Still another interesting aspect is that subscribed source streams may be received from multiple transmitters.

Yet another interesting aspect is that the receiver may handle a large number of media streams at high sample rates. A further interesting aspect is that the receiver may optimize the amount of memory used to process and generate the media streams.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION

Figure 1:
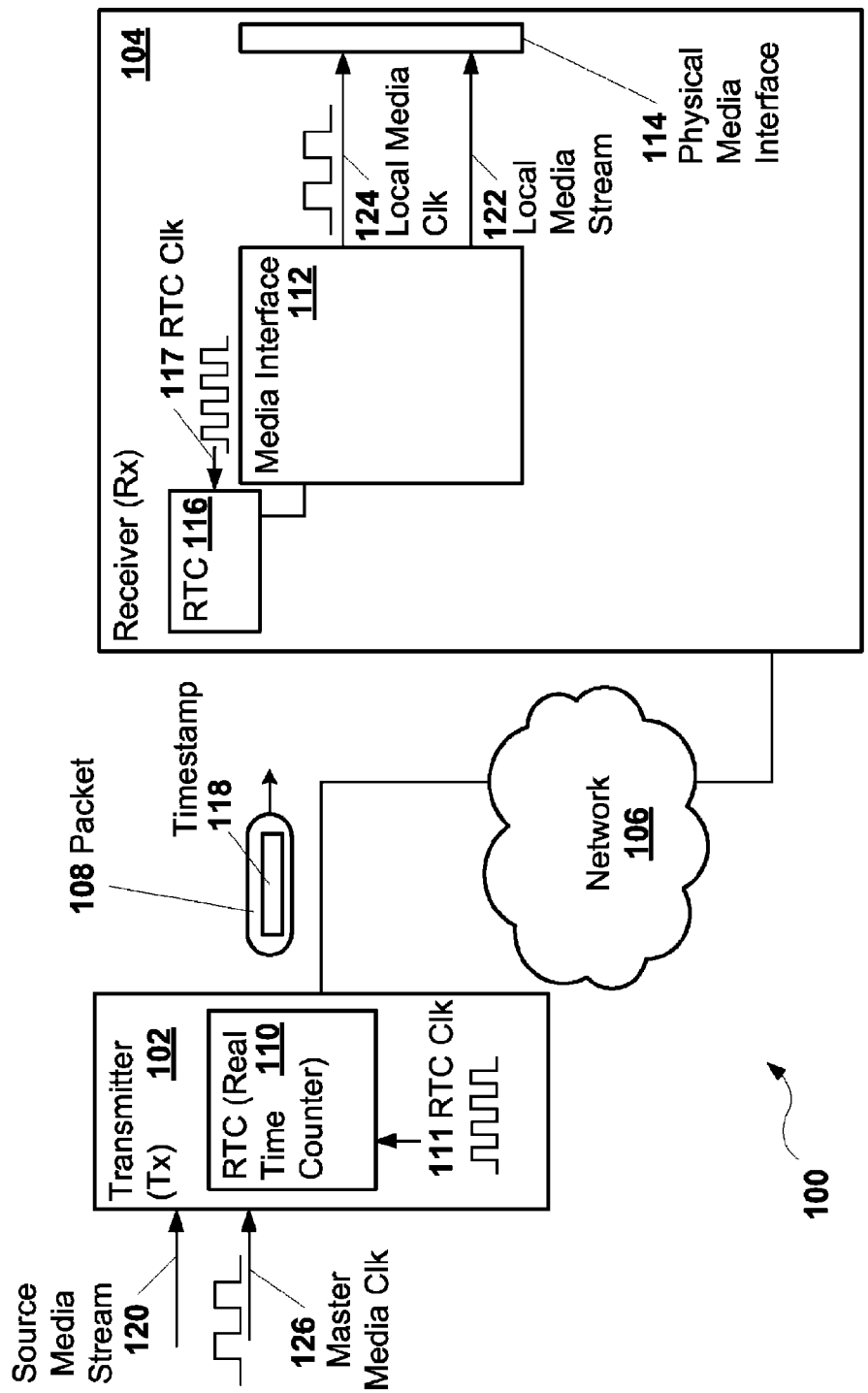
FIG. 1 illustrates an example of an Audio/Video Packet Management System (AVPM System).

FIG. 1 illustrates an example of the Audio/Video Packet Management System (AVPM System) 100. The AVPM system 100 may include a transmitter 102 and a receiver 104. Alternatively, the AVPM system 100 may include any number of transmitters, one or more receivers, or any combination thereof.

The transmitter 102 may include a device that communicates with the receiver 104 over a network 106. In particular, the transmitter 102 may transmit time-stamped packets 108 to the receiver 104 over the network 106. The transmitter 102 may include a remote Real-Time Clock or Counter (RTC) 110. Examples of the transmitter 102 include a circuit, an application specific integrated circuit (ASIC), a field programmable gate array (FPGA), a computer, a networking card, an audio digital signal processor, a video signal processor, a multi-media device, such as a networked DVD (Digital Video Disc) player that transmits an audio/video stream, or other device.

The receiver 104 may be a device that receives the time-stamped packets 108 from the transmitter 102. The receiver 104 may include a media interface 112, a physical media interface 114, and a local Real-Time Clock or Counter (RTC) 116. The term "local" means at, or included in, the receiver 104, and the term "remote" means at, or included in, a node on the network 106 other than the receiver 104, such as the transmitter 102. The receiver 104 may be referred to as a listener and a media extractor. Examples of the receiver 104 include a circuit, an application specific integrated circuit (ASIC), a field programmable gate array (FPGA), a computer, a networking card, an audio digital signal processor, a video signal processor, a multimedia device, such as a networked Video receiver configured to receive a video stream with multi-channel audio, or other device.

The local RTC 116 and the remote RTC 110 may include a counter that increases or decreases at a rate determined by a clock, such as a RTC clock 117 at the receiver 104 and a RTC clock 111 at the transmitter 102. For example, the local RTC 116 and the remote RTC 110 may be implemented as accumulation registers, digital counters, real-time clock ICs (integrated circuits) or any other suitable devices. A digital counter may be any semiconductor device that counts the number of times a digital event has occurred. The digital event may be a rising or falling edge of the RTC clock, 111 or 117, for example. The local RTC 116 and the remote RTC 110 may be synchronized using any clock synchronization protocol.

The time-stamped packet 108 may be a data packet that includes a timestamp 118. In addition, the time-stamped packet 108 may include a payload. The payload may include samples of a source media stream 120. Alternatively or in addition, the payload may not include samples of the source media stream 120. Examples of the time-stamped packet 108 include an IEEE P1722 packet or any other isochronous packet. A media stream may include a substantially continuous flow of multimedia, such as audio, video, or a combination thereof. The media stream may be a digital stream or an analog stream. The source media stream 120 may be the media steam that the transmitter 102 packetizes and transmits to the receiver 104.

The timestamp 118 may include a value read from the remote RTC 110 or a value derived from a value read from the remote RTC 110. The timestamp 118 may be dimensionless. For example, the timestamp 118 may be a value of an accumulator register included in the remote RTC 110. Alternatively, the timestamp 118 may include a unit of time. In one example, the timestamp 118 may be a sum of a value read from the remote RTC 110 and a delay value, such as a maximum transmission delay between the transmitter 102 and any receiver, such as the receiver 104.

The media interface 112 may include a component that generates a local media stream 122 on a per-media clock domain basis from the time-stamped packets 108. A media clock domain may be the sampling rate of data in a media stream, such as the source media stream 120 at the transmitter 102 and the local media stream 122 at the receiver 104. The media clock domain may be 44.1 kilohertz, 48 kilohertz, 96 kilohertz, or 192 kilohertz, for example. The media clock domain may be specific to a type of data, such as video data and/or audio data. One type of data may be transmitted in multiple formats. For example, video data may be transmitted using multiple video resolutions and/or video formats. Each type of data or format may have a corresponding media clock domain. Each type of data and/or each format may be transmitted in accordance with a corresponding one of the media clock domains. The media interface 112 may provide the local media stream 122 and a local media clock 124 to the physical media interface 114. Alternatively or in addition, the media interface 112 may provide a clock derived from the local media clock 124 to the physical media interface 114. Alternatively, the media interface 112 may provide the local media stream 122 and the local media clock 124 directly to another component of the receiver 104 without the physical media interface 114.

The local media stream 122 may include a media stream that is a recovered copy of the source media stream 120. In addition, the local media stream 122 may include recovered copies of other source media streams.

The local media clock 124 may be any periodic signal indicative of a sampling rate of data in the local media stream 122. For example, the local media clock 124 may be a square wave, a pulse wave, a sinusoid, or any other suitable periodic wave form. The frequency of the local media clock 124 may be the sampling rate frequency. The frequency of the local media clock 124 may be a multiple or fraction of the sampling rate of the data in the local media stream 122. In one example, the frequency of the local media clock 124 may correspond to twice the sampling rate of the data in the local media stream 122. In a second example, the frequency of the local media clock 124 may be an eighth of the sampling rate. In a third example, where the media stream 126 includes NTSC (National Television System Committee) video, the sampling rate may be a pixel clock rate of 27 MHz and the frequency of the local media clock 124 may be 15.734 kHz, sometimes referred to as the video line rate.

The local media clock 124 at the receiver 104 corresponds to a master media clock 126 at the transmitter 102 or at some other device on the network 106. In particular, the local media clock 124 may be synchronized with the master media clock 126. The master media clock 126 may be any periodic signal indicative of a sampling rate of data in the source media stream 120.

The physical media interface 114 may include a physical transport medium that is electrically coupled to the media interface 112 for transporting the local media stream 122 to a suitable component. Examples of the physical media interface 114 include an IxS (Time-Division Multiplexing) serial connection, an IEC (International Electrotechnical Commission) 60958 SPDIF interface, an MPEG2/4 (Moving Pictures Expert Group) interface, an interface for H.264 Transport Streams, an interface for Bt.601/656 raw video, an interface available from LINKPORT, which is a registered trademark of Compex, Inc. of Anaheim, Calif., or other tangible data transport components. Driver code in the physical media interface 114 may read data in the media stream 122, directly or indirectly, such as out of buffer memory in the media interface 112. The driver code may transmit the data in the local media stream 122 to devices other than the receiver 104 and the transmitter 102, such as to a personal computer. The physical media interface 114 may propagate the local media clock 122, or a clock signal derived from the local media clock 122, to the other devices.

The receiver 104 may include multiple media interfaces 112 and multiple corresponding physical media interfaces 114. Each one of the media interfaces 112 may generate the local media clock 124 at a frequency for the media clock domain that is applicable to the media interface 112. Consequently, the receiver 104 may receive multiple media streams from one or more transmitters 102 where at least one of the media streams is sampled at a different media clock domain than the other media streams. For example, one of the media streams may be sampled at about 44.1 kilohertz, while another one of the media streams may be sampled at about 192 kilohertz. One of the media interfaces 112 may provide the local media stream 122 sampled at about 44.1 kilohertz, and a different one of the media interfaces 112 may provide the local media stream 122 sampled at about 192 kilohertz. Each one of the media interfaces 112 may generate the local media clock 124 used by the respective media interface 112. A first one of the media interfaces 112 may generate the first local media clock 124 at about 44.1 kilohertz and a second one of the media interfaces 112 may generate the second local media clock 124 at about 192 kilohertz. The media streams may or may not be related. Alternatively or in addition, a component not included in the media interfaces 112 may generate the local media clock 124 for multiple media streams sampled at a common rate.

The network 106 may be a local area network (LAN), a wireless local area network (WLAN), a personal area network (PAN), a wide area network (WAN), the Internet, any other now known or later developed communications network, or any combination thereof. For example, the network 106 may include a packet-switched network. The network 106 may include an asynchronous network. The network 106 may transport packets unrelated to the time-stamped packets 108. The network 106 may transport packets between devices other than the transmitter 102 and the receiver 106.

During operation of the AVPM system 100, the transmitter 102 may encapsulate the source media stream 120 into time-stamped packets 108 that the transmitter 102 transmits to the receiver 104 over the network 106. The source media stream 120 may be associated with a unique stream identifier.

The receiver 104 may receive packets, including the time-stamped packets 108 transmitted by the transmitter 102, from the network 106. The receiver 104 may be programmed to receive one or more media streams, such as the source media stream 120. For example, the receiver 104 may include one or more subscribed media stream identifiers stored in memory that identify the source media streams that the receiver 104 is to receive and process. Subscribed media streams include media streams that the receiver 104 generates, which may be a subset of the complete set of media streams whose media streams samples are received by the receiver 104. If the receiver 104 includes a subscribed media stream identifier that matches the unique stream identifier associated with the time-stamped packets 108, then the receiver 104 may generate the local media stream 122 from the time-stamped packets 108.

In addition, the receiver 104 may recover the master media clock 126 by generating the local media clock 124 based on the time-stamped packets 108 and the RTC 116 in the receiver 104. Recovery of the master media clock 126 at the receiver 104 may rely on the RTC 110 in the transmitter 102 and the RTC 116 in the receiver 104 being synchronized. The RTCs 110 and 116 may be synchronized using a clock synchronization protocol.

The clock synchronization protocol may include a protocol for exchanging messages between nodes to synchronize the clock at a receiving node with the clock at the transmitter or with a clock at some other node. Examples of the clock synchronization protocol include IEEE (Institute of Electrical and Electronics Engineers) 1588:2002 Standard for a Precision Clock Synchronization Protocol for Networked Measurement and Control Systems, and IEEE 802.1AS Precision Time Protocol (PTP) in IEEE 802.1AS Standard for Local and Metropolitan Area Networks—Timing and Synchronization for Time-Sensitive Applications in Bridged Local Area Networks. For example, PTP nodes may exchange Ethernet messages that synchronize the PTP nodes to a common time reference by providing clock master selection and negotiation mechanisms, link delay measurement and compensation, and clock rate matching and adjustment mechanisms. PTP provides a Best Master Clock Algorithm (BMCA), which is an algorithm for negotiating which of the clocks in the PTP nodes is to be the master clock. In particular, BMCA describes a negotiation and a signaling mechanism that identifies a grandmaster node. Once the grandmaster node is selected, synchronization may begin automatically between the grandmaster node and the other PTP nodes known as slave nodes. PTP messages transmitted from the grandmaster node, the slave nodes, or both, may include a timestamp value taken from a Real-time clock (RTC), such as the RTC 110 in the transmitter 102. The slave nodes may compare a value of the RTC of the slave nodes, such as the RTC 116 at the receiver 104, with a value of the RTC at the grandmaster node. By using link delay measurement and compensation techniques, the slave nodes may synchronize the RTC in each of the slave nodes with the RTC at the grandmaster node. Once the RTCs are synchronized with each other, periodic messages may provide information that enables the PTP rate matching adjustment algorithms. As a result, the PTP nodes may remain synchronized to a common time.

While being encapsulated into the time-stamped packets 108 by the transmitter 102, the source media stream 120 may be provided to the transmitter 102 at a rate associated with the master media clock 126. Because the master media clock 126 and the RTC clock 111 at the transmitter 102 may be different from each other, the characteristics of the master media clock 126, such as frequency, may be different than the RTC clock 111 at the transmitter 102.

The timestamp 118 in the time-stamped packets 108 may be values of the RTC 110 at the transmitter 102 sampled at a frequency determined by the master media clock 126. For example, the transmitter 102 may sample the RTC 110 at the transmitter 102 at a frequency equal to the frequency of the master media clock 126. Additionally, the sampled values of the source media stream 120 may have been sampled at a rate determined by the master media clock 126. For example, the sampled values of the source media stream 120 may have been sampled at a frequency equal to the frequency of the master media clock 126. Each timestamp 118 may include a value of the RTC 110 sampled as the transmitter 102 prepared to send the time-stamped packet 108. Each of the time-stamped packets 108 may include the timestamp 118 and one or more sampled values of the source media stream 120. For example, the transmitter 102 may generate two packets, where each one of the packets includes a timestamp 118 for the portion of the source media stream 120 included in that packet.

Figure 2:
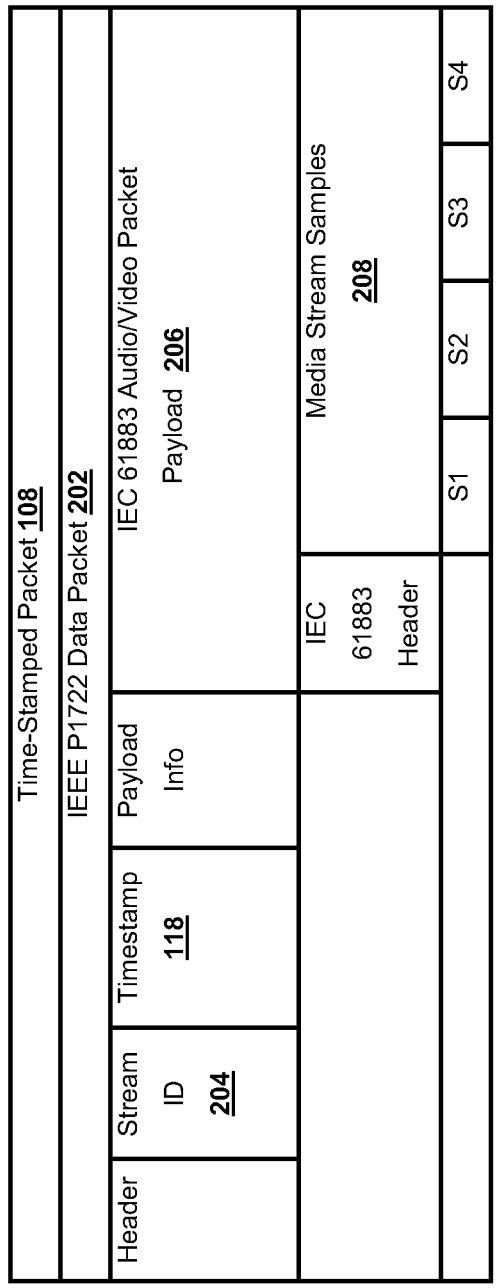
FIG. 2 illustrates an example of a time-stamped packet that includes an IEEE P1722 data packet.

FIG. 2 illustrates an example of the time-stamped packet 108 that includes an IEEE P1722 data packet 202. The P1722 data packet 202 may include a stream ID (identifier) 204, the timestamp 118, and a payload 206. The payload 206 may include formatted data, such as an IEC 61883 audio/video packet or data in any other suitable format. The payload 206 may include media stream samples 208. In FIG. 2, the payload 206 includes four of the media stream samples 208 from one source media stream or channel. Alternatively or in addition, a single one of the time-stamped packets 108 may include media stream samples 208 from two or more source media streams or channels. For example, the payload 206 may include one or more data blocks, where each data block includes the media stream samples 208 for a number of media channels. Alternatively or in addition, the transmitter 102 may include the media stream samples 208 from a first one of the source media streams in a first P1722 data packet 202 and the media stream samples 208 from a second one of the source media streams in a second P1722 data packet 202. The stream ID 204 in the first P1722 data packet 202 may identify the first one of the media streams, and the stream ID 204 in the second P1722 data packet 202 may identify the second one of the media streams.

Referring back to FIG. 1, the receiver 104 may provide both the local media stream 122 and the local media clock 124 via the physical media interface 114 to a consumer component or some other client of the local media stream 122. In response, the consumer component may read the media stream on an edge of the local media clock 124. In one example, the consumer component may include an I2S (Integrated Interchip Sound) compliant device that reads a word of sampled data from a set of data lines at a rate determined by a clock on a word clock line. The receiver 104 may generate the local media clock 124 on the word clock line and provide each word of the local media stream 122 on the set of data lines in compliance with the I2S standard. The receiver 104 may generate the local media clock 124 such that the local media clock 124 is synchronized with the master media clock 126 at the transmitter 104.

The receiver 104 may recover multiple master media clocks. One receiver may receive audio/video media streams from multiple transmitters nearly simultaneously, where each one of the media streams is provided to the transmitters at a rate determined in part by a different one of the master media clocks. Each one of the master media clocks may operate independently from the other master media clocks. For example, the frequencies and periods of the master media clocks may vary. Each one of the master media clocks may have different characteristics than the RTC clocks at the transmitters. Alternatively or in addition, one receiver may receive multiple source media streams from a single transmitter, where each one of the source media streams is sampled at a different rate than the others because the source media streams are sampled at rates determined by multiple master media clocks at the single transmitter. Alternatively or in addition, multiple source media streams may be sampled at a single common rate.

At the receiver 104, the media interface 112 may generate the local media clock 124 from the time-stamped packets 108. The media interface 112 may include a frequency synthesizer, such as a Direct Digital Synthesizer (DDS), that generates the local media clock 124. The media interface 112 may determine the period of the master media clock 126 based on a change in a first set of timestamps included in the time-stamped packets 108. The first set of timestamps may be values of the RTC 110 at the transmitter 102 sampled at a frequency determined by the master media clock 126. For example, the transmitter 102 may generate two packets, one after the other, where each one of the packets includes a timestamp for the portion or portions of the source media stream 120 included in that packet 108. The media interface 112 may calculate the period of the local media clock 124 as a difference between the two timestamps.

The media interface 112 may read a second set of timestamps from the RTC 116 at the receiver 104 by sampling the RTC 116 on an edge of the local media clock 124, such as on a rising edge of the local media clock, a falling edge, or on both. The media interface 112 may determine a period of the local media clock 124 based on a change in the second set of timestamps. The media interface 112 may adjust the frequency of the local media clock 124 with the frequency synthesizer in order to limit the difference between the period of the master media clock 126 and the period of the local media clock 124. Once the period of the master media clock 126 and the period of the local media clock 124 are the substantially identical, the frequencies of the clocks are substantially identical. The local media clock 124 is syntonized with master media clock 126 when the two clocks have substantially the same frequency.

The media interface 112 may determine a phase difference between the master media clock 126 and the local media clock 124 by comparing one or more of the timestamps in the time-stamped packets 108 with one or more corresponding timestamps read from the RTC 116 at the receiver 104. If the master media clock 126 and the local media clock 124 are syntonized, then a difference between a timestamp in one of the packets 108 and a value of the RTC 116 at the receiver 104 may indicate the extent of a phase shift between the master media clock 126 and the local media clock 124. The difference between the timestamp in the packet 108 and the value of the RTC 116, when divided by the period of the syntonized clocks 126 and 124, may generate a remainder that indicates the phase difference between the master media clock 126 and the local media clock 124. For example, the phase difference, $\Delta P$, may be determined as $\Delta P=\mathrm{mod}(Y-X, T)$, where Y is the timestamp 118 in the time-stamped packet 108 generated based on a value read from the remote RTC 110 on an edge of the master media clock 126; X is a local RTC timestamp read from the local RTC 116 on an edge of the local media clock 124; T is the syntonized period; and mod( ) is the modulo operator. If the phase difference, $\Delta P$, is below a threshold value, then the clocks 126 and 124 may be considered synchronized. The media interface 112 may adjust the phase of the local media clock 124 with the frequency synthesizer in order to keep the phase difference between the master media clock 126 and the local media clock 124 below a predetermined threshold. Further examples of media clock recovery are described in U.S. patent application Ser. No. 12/874,836, entitled "MEDIA CLOCK RECOVERY," and filed Sep. 2, 2010, which is incorporated by reference.

The AVPM system 100 may include additional, fewer, or different elements. For example, the AVPM system 100 may include just the receiver 104.

The transmitter 102 and the receiver 104 may include additional, fewer, or different components. For example, the transmitter 102 and the receiver 104 may each include a network interface controller (NIC). The NIC may include hardware or a combination of hardware and software that enables communication over the network 106. The NIC may provide physical access to the network 106 and provide a low-level addressing system through use of, for example, Media Access Control (MAC) addresses. The NIC may include a network card that is installed inside a computer or other device. Alternatively or in addition, the NIC may include an embedded component as part of a circuit board, a computer mother board, a router, an expansion card, a printer interface, a USB (universal serial bus) device, or as part of any other hardware.

The components, such as the RTC 110 or 116, the media interface 112, or the physical media interface 114, may include additional, fewer, or different components. For example, physical media interface 114 may include a digital to analog converter.

1. Receiver.

Figure 3:
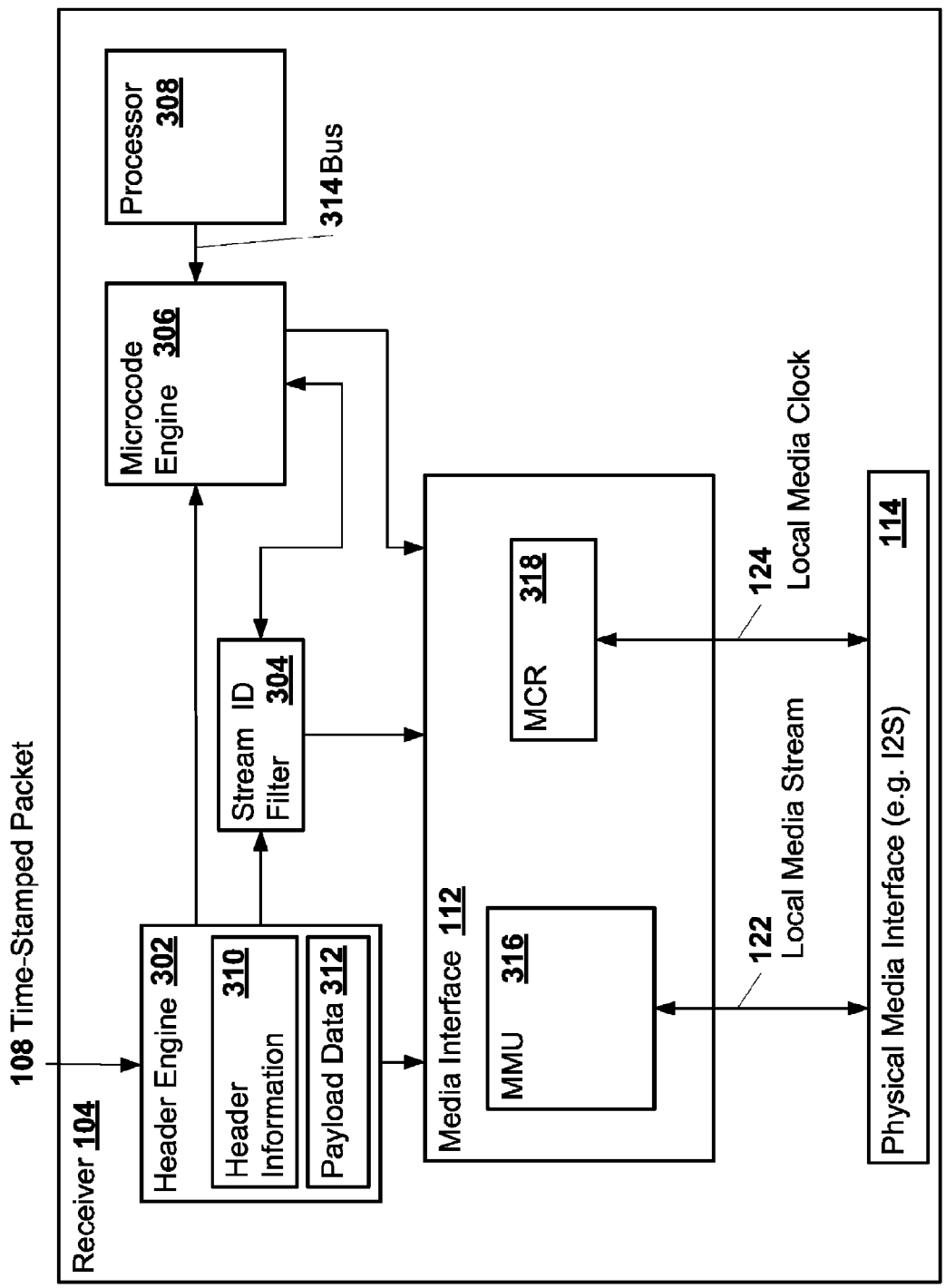
FIG. 3 illustrates an example of a receiver.

FIG. 3 illustrates an example of components of the receiver 104. The components of the receiver 104 may include a header engine 302, a stream ID filter 304, a microcode engine 306, a processor 308, the media interface 112, and the physical interface 114.

The header engine 302 may include a component that extracts header information 310, such as the timestamp 118 and the stream ID 204, from the time-stamped packet 108. The header engine 302 may provide the header information 310 to other components in the receiver 104, such as the stream ID filter 304, the microcode engine 306, and the media interface 112. In addition, the header engine 302 may provide payload data 312, such as the media stream samples 208, to the media interface 112 and other components.

The stream ID filter 304 may include a component that determines whether the receiver 104 subscribes to the source media stream 120 identified by the stream ID 204 in the header information 310. If the receiver 104 subscribes to a particular stream ID, then the receiver 104 may generate a corresponding local media stream 122. Alternatively, if the receiver 104 is not subscribed to the particular stream ID, then the receiver 104 may not generate the corresponding local media stream 122.

The microcode engine 306 may include a component that processes microcode or commands. The commands may be for subscribing or unsubscribing to media streams. Alternatively or in addition, the commands may be for routing the media stream samples 208 associated with a particular stream ID to a particular one of the media interfaces that generates the corresponding local media stream. Alternatively or in addition, if the media interface 112 is configured to receive multiple media streams, then the commands may identify which media stream is in the payload data 312. In addition, the commands may be for other features. An example of the microcode engine 306 is the descriptor engine described in U.S. Provisional Application No. 61/314,263, entitled "AUDIO/VIDEO PACKET MANAGEMENT SYSTEM."

The processor 308 may include any hardware component that executes computer readable instructions. For example, the processor 308 may be a microcontroller, a soft core processor, an ASIC (application-specific integrated circuit), an FPGA (field programmable gate array), a CPLD (complex programmable logic device), a central processing unit of a computing device, a general processor, a digital signal processor, a digital circuit, an analog circuit, or any combination thereof. An example of the soft core processor includes MicroBlaze designed for Xilinx FPGAs from Xilinx™, a registered trademark of Xilinx, Inc of San Jose, Calif.

The processor 308 may be in communication with the microcode engine 306 over a bus 314 or any other communication mechanism. The bus 314 may include an interface that transfers data between the processor 308 and the microcode engine 306. The bus 314 may include a data bus internal to a computing device, a parallel bus, a serial bus, a PLB (Processor Local Bus), or any other medium for transferring data between components.

During operation of the receiver 104, the processor 308 may write commands to the microcode engine 306. For example, in response to selection of a particular media stream in a graphical user interface or other event, the processor 308 may write commands that subscribe to the corresponding stream ID 204 to the bus 314. Alternatively or in addition, in response to selection of the particular media stream in the graphical user interface, the processor 308 may write commands that unsubscribe to the corresponding stream ID 204. Alternatively or in addition, the processor 308 may read commands from the microcode engine 306 that were previously stored prior to writing new commands to the bus 314.

In order to subscribe to the stream ID 204, the processor 308 may determine the time domain of the corresponding source media stream 120. The processor 308 may determine which one of the media interfaces is configured for the determined time domain. Each one of the media interfaces may generate multiple local media streams from multiple source media streams. Alternatively or in addition, each one of the media interfaces may generate a single local media stream from multiple source media streams. Accordingly, the media interface 112 may be configured to have N channels corresponding to N possible source media streams assigned to the media interface 112. The processor 308 may further determine a channel offset value that identifies which one of the channels corresponds to the source media stream 120 identified by the stream ID 204. In one example, the channel offset value may identify a location in an output block of a buffer in media interface 112 at which to write a media stream sample of the source media stream 120. For example, the channel offset value may be a memory offset value or a channel number that may be used to determine the memory offset value. The processor 308 may write commands to the microcode engine 306 for subscribing to the stream ID 204 and for routing any media stream samples 208 for the stream ID 204 to the appropriate channel of the appropriate media interface. For example, the processor 308 may store the commands in a local memory buffer so that, subsequently, each time any time-stamped packet 108 for the stream ID 204 arrives, the microcode engine 306 may process the time-stamped packet 108 appropriately.

In response to the processor 308 writing one or more subscribe commands to the microcode engine 306, the microcode engine 306 may transmit the stream ID 204 identified in the subscribe command to the stream ID filter 304. As a result, the stream ID filter 304 may store the stream ID 204 as a subscribed media stream identifier and later identify the subscribed media stream identifier when requested. In one example, the microcode engine 306 may also provide the stream ID filter 304 with an identification of the commands that route the subscribed media stream to the appropriate channel of the appropriate media interface.

Once subscribed to one or more source media streams, the receiver may generate the local media stream 122 from the time-stamped packets 108. The receiver 104 may receive a substantial number of time-stamped packets 108 over the network 106 in a short period of time. For example, if the receiver 104 subscribes to 255 media streams, and the transmitter 102, or transmitters, transmit time-stamped packets 108 for all 255 media streams substantially in parallel, then the receiver 104 may have to process the time-stamped packets 108 very quickly. To that end, the header engine 302, the stream ID filter 304, the microcode engine 306, and the media interface 112 may be implemented as digital or analog circuits in, for example, an integrated circuit. The header engine 302, the stream ID filter 304, the microcode engine 306, and the media interface 112 may communicate with each other over lines that propagate digital or analog signals. For example, the header engine 302 may transmit the payload data 312 and the header information 310 to the media interface 112 over the lines.

When the receiver 104 receives the time-stamped packets 108, the header engine 302 may sequentially read the data in the time-stamped packets 108 from a network interface controller or a portion of the network interface controller, such as an IEEE 802.1 Ethernet Audio/Video Bridging (AVB) endpoint. The Ethernet AVB endpoint may include a combination of dedicated hardware and embedded firmware. In one example, the Ethernet AVB endpoint may include software and one or more central processing units.

Having read the data in the time-stamped packets 108, the header engine 302 may extract the header information 310 and provide the header information 310 to other components. For example, the header engine 302 may provide the stream ID 204 to the stream ID filter 304 after the header engine 302 extracts the stream ID 204 from the data in the time-stamped packet 108. In response, the stream ID filter 304 may lookup the stream ID 204 to determine whether the stream ID 204 is for a subscribed media stream. If the stream ID 204 is for a subscribed media stream, then the stream ID filter 304 may instruct the microcode engine 306 to execute the commands that route media stream samples 208 in the payload data 312. Alternatively, if the stream ID 204 is not a subscribed media stream, the time-stamped packet 108 may be ignored.

In response to executing the routing commands, the microcode engine 306 may direct the appropriate one of the media interfaces to process the media stream samples 208 in the payload data 312. The microcode engine 306 may also provide the media interface 112 with the channel offset value in the media interface 112 that corresponds to the subscribed media stream.

The media interface 112, in response to the routing command, may process the media stream samples 208 in the payload data 312. In particular, a memory management unit 316 in the media interface 112 may buffer the media stream samples 208 so that the media interface 112 may generate the local media stream 122 from the media stream samples 208 at the appropriate time. For example, if the timestamp 118 in the packet 108 with the media stream samples 208 is a presentation time, then the media interface 112 may generate the local media stream 122 from the media stream samples 208 when the RTC 116 at the receiver 104 subsequently matches the presentation time.

In addition, the media interface 112 may also include a media clock recovery component 318 that generates the local media clock 124 from the timestamps in the time-stamped packets 108 and the RTC 116 in the receiver 104. For example, the media clock recovery component 318 may include the frequency synthesizer and the logic for recovering the local media clock 124 described above. In one example, the media clock recovery component 318 may include a media clock recovery device. Examples of the media clock recovery device include a digital circuit, a FPGA, a frequency synthesizer, a microcontroller, or any other hardware or combination of hardware and software that generates the local media clock 124 from the timestamps in the time-stamped packets 108 and the RTC 116 in the receiver 104.

The media interface 112 may include additional, fewer, or different components. For example the media clock recovery component 318 may be included in the receiver 104, but not in each one of the media interfaces.

The receiver 104 may include additional, fewer, or different components than illustrated in FIG. 3. In a first example, the receiver 104 may include additional media interfaces and corresponding physical interfaces. In a second example, the receiver 104 may not include the physical media interface 114.

2. Stream ID Filter.

Figure 4:
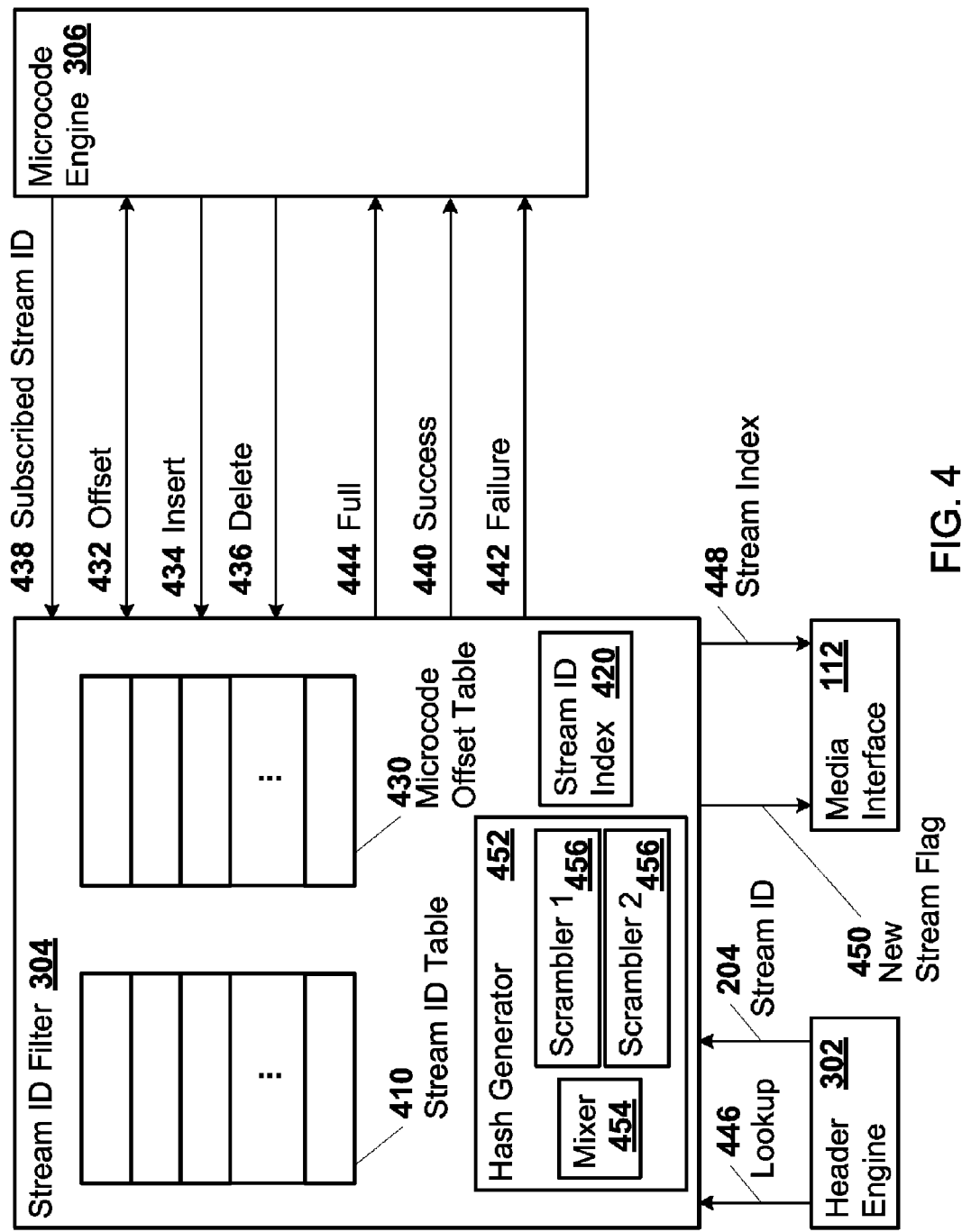
FIG. 4 illustrates an example of a stream ID filter.

FIG. 4 illustrates an example of the stream ID filter 304. The stream ID filter 304 may include a stream ID table 410, a stream ID index 420, a hash generator 452, and a microcode offset table 430.

The stream ID table 410 may include memory that identifies subscribed media stream identifiers. In one example, the stream ID table 410 may include the subscribed media stream identifiers stored in an array sized to include stream identifiers numbering no more than a maximum number of supported streams, such as 16 or 256. In a second example, the stream ID table 410 may include memory indexed by the unmodified stream ID 204 that includes a flag at each indexed location indicating whether the corresponding stream ID 204 is a subscribed media stream identifier. In a third example, the stream ID table 410 may include a hash table indexed by a hash of the stream ID 204, where the hash table includes subscribed media stream identifiers.

The stream ID index 420 includes an index to the stream ID table 410 that corresponds to the stream ID 204 received from the header engine 302. In one example, the stream ID index 420 may also be, or include, an index to the microcode offset table 430.

The microcode offset table 430 may include memory that includes offsets identifying routing commands that correspond to subscribed media stream identifiers. For example, each one of the offsets may identify a memory location where routing commands for the corresponding subscribed media stream are stored in the microcode engine 306. The microcode offset table 430 may be indexed by the same stream ID index 420 used for the stream ID table 410. Alternatively, the microcode offset table 430 may be indexed differently.

If the receiver 104 may potentially subscribe to a large number of media streams concurrently, such as 512 streams, particular implementations of the stream ID table 410 may not enable the stream ID filter 304 to lookup up the stream ID 204 fast enough in order for the receiver 104 to process the time-stamped packets 118. Buffering packets may not be a suitable option due to the amount of memory used in buffering the packets 118 arriving at a nearly constant rate. Alternatively or in addition, if the stream ID 204 is large, such as 64 bits, then particular implementations of the stream ID table 410 may not enable the stream ID filter 304 to lookup the stream ID 204 fast enough. Alternatively or in addition, the stream ID table 410 may use an excessive amount of memory.

Since each time-stamped packet 108 may be processed in real-time, a linear search of 512 (or even 32) entries in the stream ID table 410 may not be possible in the limited number of clock cycles between the time that the stream ID 204 is available in the header information 310 and the time that the payload data 312 is to be processed. Conversely, a brute force parallel search such as content-addressable memory (CAM) may be too resource intensive to be feasible.

Implementing the stream ID table 410 as a hash table using linear probe collision avoidance may provide extremely fast lookup and use a suitable amount of memory. In one implementation of the hash table described below, if the hash table is large enough that the stream ID table 410 is at most half full when the maximum supported number of streams are subscribed to, then insertion, deletion, and lookup operations on the hash table may complete, on the average, in one or two clock cycles of a clock driving the stream ID filter 304. Thus, the stream ID table 410 may be set at twice the size of the maximum number of streams supported by the receiver 104 in order to balance performance with the amount of memory used to implement the stream ID table 410. The size of the stream ID table 410 may be less than twice the size of the maximum number of supported streams, but the stream ID filter 304 may incur a higher latency in determining whether the stream ID 204 is a subscribed media stream.

The hash generator 452 may include one or more components that generate the stream ID index 420 from a hash function applied to the stream ID 204. The hash function to generate the stream ID index 420 may be based on knowledge of the format of the stream ID 204. The hash function may generate the stream ID index 420 as a function of two or more portions of the stream ID 204. For example, if the stream ID 204 is a 64-bit IEEE 1722 standard stream ID, then the hash function may be the following:

$$\text{Index}=(\text{streamID}[63:32] \text{ XOR } \text{streamID}[31:0]) \text{ AND } (\text{HASH\_SIZE}-1)$$

where XOR is the "exclusive or" operator, AND is the "logical and" operator, "streamID[63:32]" and "streamed[31:0]" refer to the 63rd through the 32nd bits and the 31st through the 0th bit, respectively of the stream ID 204, and HASH_SIZE is the number of entries in the stream ID table 410.

The hash function described above may be re-written as the following:

$$\text{Index}=\text{mod}(\text{streamID}[63:32] \text{ XOR } \text{streamID}[31:0], \text{HASH\_SIZE})$$

where mod is the modulus operator. Given two positive integers, a (the dividend) and n (the divisor), modulus (a, n) may be calculated as the remainder, on division of a by n. The most-significant bits of the stream ID 204 may be XORed with the least-significant bits of the stream ID 204.

The hash functions described above may be beneficial for two reasons. First, if the stream ID 204 complies with the IEEE 1722 standard specification, then the stream ID 204 includes the first six bytes of the MAC address of the transmitter 102, followed by two bytes that uniquely identify the stream from other streams that the transmitter 102 might transmit. Accordingly, an XOR of the first four bytes with the last four bytes may give a high probability of a unique number being generated as a result of the XOR operation. The second reason is that an XOR is a very fast and simple operation to perform. In another example, different portions of the stream ID 204 may be used as the operands of the XOR operator.

The XOR operation is one possible combination of a first portion of the stream ID 204 and a second portion of the stream ID 204. Alternatively or in addition, the combination of the first and second portions may be a binary addition of the first and second portions of the stream ID 204 without carry. For example, a first n-bit number XORed with a second n-bit number is equivalent to the first and second n-bit numbers added together without carry. The hash function may apply to any suitable combination of two or more of portions of the stream ID 204.

The combination of the portions of the stream ID 204 described above may yield a result, such as a 32-bit result, that is too large to be used to index the hash table. The hash table may have, for example, a 10-bit address width where the maximum supported number of streams is 512. For this reason, the XOR result or any other combination of the portions of the stream ID 204 may be sent through a modulus function making the stream ID index 420 fit the size of the hash table. Alternatively or in addition, values other than HASH_SIZE and HASH_SIZE-1 may be used as the divisor in the modulus operation or as the second operand of the logical AND function.

Hash table collisions may occur when a value other than the stream ID 204 is located at the stream ID index 420 generated by applying the hash function to the stream ID 204. In other words, the value of the hash function may be the same for two different stream identifiers. When hash table collisions occur, linear probing may be used. Linear probing includes incrementing or decrementing the stream ID index 420 that had the collision until an empty entry is found on an insert operation, or either a matching entry or empty entry is found on a lookup or delete operation, respectively.

Alternatively or in addition, the hash generator 452 may determine the stream ID index 420 from one or more pseudorandom values. The hash generator 452 that determines the stream ID index 420 from pseudorandom values may include a mixer 454 and two scramblers 456.

The mixer 454 may include a component that rearranges an order of the bytes and/or bits of the stream ID 204 so that the bits of the stream ID 204 most likely to be unique to a particular stream ID are spread across two or more portions of the stream ID 204. The two portions may include, for example, the most significant bytes and the least significant bytes, respectively, of the stream ID 204. In one example, the mixer 454 may rearrange a 64-bit stream ID by rearranging particular bytes from the most significant 32-bits into the least significant 32-bits and vice versa. For example, the mixer 454 may place bits that are most likely to vary across stream IDs, such as the bits in bytes 6 and 8 of the IEEE 1722 standard stream ID, into the least significant bits of each half of the stream ID 204. For example, the mixer 454 may rearrange the order of eight bytes (bytes 1:2:3:4:5:6:7:8) in the stream ID 204 to 1:2:3:8:4:5:7:6. Thus, the two mixed portions of the stream ID 204 may include bytes 1:2:3:8 and 4:5:7:6, respectively.

Each mixed portion of the stream ID 204, such as each half of the stream ID 204, may be processed by a corresponding one of the scramblers 456. Each one of the scramblers 456 may produce a pseudorandom set of values in a sequence that starts with a seed value. While the sequence may approach statistical randomness, the sequence is deterministic. In other words, the scrambler produces the same output for a particular seed value. The scrambler may be implemented as a linear feedback shift register (LFSR). A linear feedback shift register (LFSR) may include a shift register whose input bit is a linear function of the shift register's previous state. Bit positions of the current value in the linear feedback shift register that affect the next state may be referred to as "taps." The initial value of the LFSR may be referred to as a "seed value." Each new state of the LFSR may be referred to as the "output value" of the LFSR. Consecutive output values may include the pseudorandom set of values in the sequence. Due to the simple feedback logic, the LFSR may run at much higher frequencies than traditional binary or gray code sequencers. Each one of the scramblers 456 may include a different LFSR than the other one of the scramblers 456. For example, each one of the LFSRs in the scramblers 456 may have different irreducible polynomials than the other LFSR.

For example, the hash generator 452 may load a first mixed portion of the stream ID 204, such as the four most significant bytes (1:2:3:8) of the mixed stream ID into a first one of the scramblers 456 with taps at bits 32, 31, 30, 10, in order to obtain an output value, lfsrHigh. The hash generator 452 may load a second mixed portion of the stream ID 204, such as the four least significant bytes (4:5:7:6) of the mixed stream ID bytes, into a second one of the scramblers 456 with taps at bits 32, 31, 16, 2, in order to obtain output value, lfsrLow. In different examples, different taps may be chosen. lfsrHigh and lfsrLow may represent a scrambled version of each of the mixed portions of the stream ID 204.

The hash generator 452 may generate the hash value, stream ID index 420, as, for example: Index=(lfsrHigh XOR lfsrLow) AND (HASH_SIZE-1). Alternatively or in addition, the hash generator 452 may determine the hash value as, for example: Index=mod(lfsrHigh XOR lfsrLow), HASH_SIZE).

In order to resolve collisions, the one or more pseudorandom values in a sequence generated by the scramblers 456 may be used instead of, or in addition to, linear probing. For example, in order to resolve a detected collision, the hash generator 452 may load the outputs of the scramblers 456, lfsrHigh and lfsrLow, into the respective scramblers 456 instead of loading the mixed portions of the stream ID 204 generated by the mixer 454. Accordingly, the scramblers 456 may generate a new lfsrHigh and a new lfsrLow. The hash generator 452 may generate a new hash value as, for example: Index=(the new lfsrHigh XOR the new lfsrLow) AND (HASH_SIZE-1). If another collision is detected with the new hash value, then the hash generator 452 may repeat the process by loading the new outputs of the scramblers 456, new lfsrHigh and new lfsrLow, into the respective scramblers 456.

The hash generator 452 may continue to generate new hash values with the scramblers 456 until no collision is detected or until a timeout occurs. If a timeout is reached before collisions are avoided, an error condition may be set. Application of the scramblers 456 may provide an increase in uniformity of distribution of hash values as compared to linear probing. Linear probing may tend to cluster values whereas deterministic pseudorandom probing may distribute the hash values more uniformly.

As described in more detail below, the microcode engine 306 may cause the stream ID filter 304 to insert or delete an entry in the stream ID table 410 in response to processing a stream ID insert command or a stream ID delete command, respectively. For example, the microcode engine 306 may assert insert or delete signals, 434 or 436, for the stream ID insert command or the stream ID delete command, respectively. The microcode engine 306 may pass the subscribed media stream ID 438 to be inserted into, or deleted from, the stream ID table 410. In one example, the microcode engine 306 may pass an offset 432 to stream ID filter 304 in response to processing the stream ID insert command. The offset 432 may identify a memory location containing commands that the microcode engine 306 is to process whenever the stream ID 204 in the time-stamped packet 108 matches the subscribed media stream ID 438. The stream ID filter 304 may store the offset 432 in the microcode offset table 430. The microcode offset table 430 may be the same size as the stream ID table 410 and, therefore, have the same stream ID index 420 as the stream ID table 410. Alternatively, the microcode offset table 430 may use a different index than the stream ID index 420 for the stream ID table 410.

The stream ID filter 304 may assert a success signal 440 upon successful insertion or deletion. Likewise, the stream ID filter 304 may assert a failure signal 442 to indicate an error occurred. The stream ID filter 304 may assert a full signal 444 to indicate that the stream ID table 410 has reached the TABLE SIZE value or to otherwise indicate that the stream ID filter 304 is not accepting any more subscribed media stream IDs from the microcode engine 306.

When the receiver 104 receives a new time-stamped packet 108, the header engine 302 may begin initial processing. When the header engine 302 identifies the stream ID 204 in the time-stamped packet 108, the header engine 302 may pass the stream ID 204 to the stream ID filter 304 for approval. The header engine 302 may also assert a lookup signal 446 in addition to passing the stream ID 204 to the stream ID filter 304.

The stream ID filter 304 may generate, in response to the lookup signal 446 received from the header engine 302, the stream ID index 420 from the stream ID 204. If the stream ID filter 304 finds a match in the stream ID table 410 for the stream ID 204, then the stream ID filter 304 may assert the success signal 446 to the microcode engine 306. In addition, if the stream ID filter 304 finds a match, then the stream ID filter 304 may use the stream ID index 420 to lookup the offset 432 stored in the microcode offset table 430. The stream ID filter 304 may provide the offset 432 to the microcode engine 306. Alternatively, if no match is found, then the stream ID filter 304 may assert the failure signal 442 to the microcode engine 306. The remainder of the time-stamped packet 108 may be ignored if the stream ID filter 304 finds no match for the stream ID 204 in the stream ID table 410.

As described in more detail below in reference to FIG. 7, each one of the media interfaces may include a housekeeping table for keeping track of a write window for each media stream assigned to the media interface 112. The write window may identify a memory block that contains data to be presented to the physical media interface 114 at the time indicated in the timestamp 118. For each media stream assigned to the media interface 112, the media interface 112 may determine which write window to use. The stream ID index 420 into the stream ID table 410 may be used by the media interface 112 to lookup the write window in the housekeeping table. Accordingly, the stream ID filter 304 may transmit the stream ID index 420 to the media interface 112.

Alternatively or in addition, the stream ID filter 304 may transmit a stream index 448 to the media interface 112. The stream index 448 may include any value that may be used to look up an item in a table, where the value is less than or equal to the maximum number of items in the table. For example, the value may be less than or equal to the maximum number of subscribed media streams supported by the receiver 104. The stream index 448 may be, for example, a zero-based number ranging from 0 to 63, where the receiver 104 supports up to 64 streams.

Alternatively, commands for the subscribed media stream ID 438 that are executed by the microcode engine 306 may identify the stream index 448 for the stream ID 204. The device or software responsible for directing the processor 308 to write commands to the microcode engine 306 may allocate and assign the stream index 448 to a corresponding subscribed media stream. Therefore, the microcode engine 306—instead of the stream ID filter 304—may provide the stream index 448 to the media interface 112

In one example, the first time a packet from a new media stream arrives, the stream ID filter 304 may assert a new stream flag 450 to indicate to the media interface 112 that the media interface 112 is to calculate an initial circular buffer offset based on presentation time. The stream ID filter 304 may use, for example, a parity bit in the stream ID table 410 to track which streams are considered new.

The stream ID filter 304 may include additional, fewer, or different components. For example, the stream ID filter 304 may not include the microcode offset table 430.

The hash generator 452 may include additional, fewer, or different components. For example, the hash generator 452 may not include the mixer 454. The hash generator 452 may seed the scramblers with 456 unmixed portions of the stream ID 204. In another example, the hash generator 452 may include any number of scramblers 456. Each one of the scramblers 456 may be the same or different from the other scramblers 456. IN particular, each LFSR in the scramblers 456 may have the same or a different irreducible polynomial than the other LFSRs.

3. Header Engine.

Figure 5:
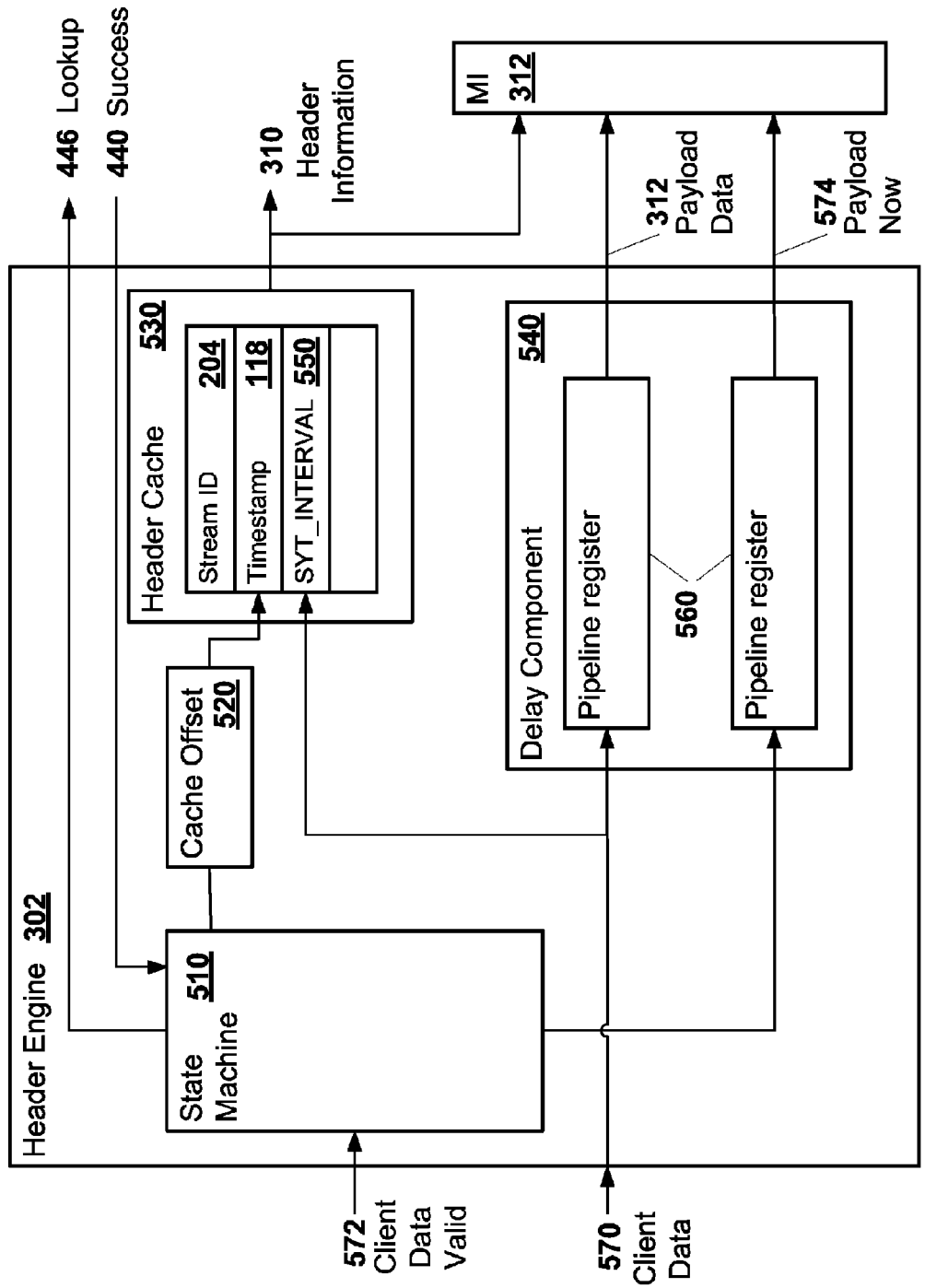
FIG. 5 illustrates an example of a header engine.

FIG. 5 illustrates an example of the header engine 302. The header engine 302 may include a state machine 510, a cache offset 520, a header cache 530, and a delay component 540.

The state machine 510 may include a component that generates one or more signals based on a current state, where the current state depends on what portion of the time-stamped packet 108 the header engine 302 is processing. In one example, the state machine 510 may be a finite state machine implemented as a digital logic circuit.

The header cache 530 may include a component that caches the header information 310. Examples of the header cache 520 include a set of registers or other memory. The header cache 520 may include a register for the stream ID 204, the timestamp 118, a SYT_INTERVAL 550 or any other value extracted or derived from the time-stamped packet 108. The SYT_INTERVAL 550 may be the number of samples of the media stream 122 between timestamps. The header cache 530 may provide the header information 310 to other components such as the stream ID filter 304 and the media interface 112.

The cache offset 520 may include a component that identifies a location in the header cache 530. For example, the cache offset 520 may identify a register in a set of registers. Examples of the cache offset 520 include a digital counter and a memory location updated by the state machine 510.

The delay component 520 may include a component that receives one or more inputs and provides one or more corresponding outputs a number of clock cycles after receiving the inputs. For example, the delay component 520 may include one or more pipeline registers 560.

During operation of the header engine 302, the header engine 302 may sequentially read data from the time-stamped packets 108. For example, the header engine 302 may read byte-wide data as client data 570. The header engine 302 may receive a client data valid 572 signal indicating the client data 570 is valid.

As the header engine 302 processes the time-stamped packets 108, the state machine 510 may increment the cache offset 520 so that the cache offset 520 indicates the appropriate memory location in the header cache 530 to store the client data 570. For example, if the first byte in the stream ID 204 is in the client data 570, then the cache offset 520 may point to the first byte of the stream ID 204 in the header cache 530. If the second byte in the stream ID 204 is the client data 570, then the cache offset 520 may point to the second byte of the stream ID 204 in the header cache 530. The state machine 510 may continually update the cache offset 520 as the header engine 302 receives the client data 570 corresponding to the header information 310.

One item cached in the header cache 530 may be the timestamp 118. In one example, the timestamp 118 may be a presentation time. The presentation time may be the time, according to the local RTC 116, at which one or more of the media stream samples 208 in the time-stamped packet 108 are to be presented to the physical media interface 114. In a second example, the presentation time may be the timestamp 118 plus a propagation delay value. In a third example, the presentation time may be any other value derived from the timestamp 118.

The header engine 302 may also determine the number of samples of the source media stream 122 between timestamps to populate the SYT_INTERVAL 550 in the header cache 530. Each one of the time-stamped packets 108 may include multiple data blocks, where each one of the data blocks corresponds to one of the media stream samples 208. Additionally, one time-stamped packet 108 may include the media stream samples 208 of more than one source media streams, or channels, such as a left and right audio channel. Each one of the data blocks may include a sampled value of each one of the media streams. Each one of the time-stamped packets 108 may include one timestamp 118 or multiple timestamps. Including one timestamp 118 for multiple data blocks may be more efficient than including one timestamp 118 for each individual data block, or for each individual sample. Accordingly, SYT_INTERVAL 550 may be useful when processing the time-stamped packet 108. In one example, SYT_INTERVAL 550 is included in the header of the time-stamped packet 108. In a second example, the header engine 302 may derive SYT_INTERVAL 550 from a lookup table based on information in the header of the time-stamped packet 108. For example, the SYT_INTERVAL may be derived from a 3 bit value in a SFC (Sampling Frequency Code) field of a FDF (Format Dependent Field) portion of a CIP (Common Isochronous Packet) header. The header engine 302 may look up the 3 bit value in the lookup table in order to obtain a value for SYT_INTERVAL 550 such as 8,16, or 32. In a third example, the SYT_INTERVAL 550 may be the value "1," if the timestamp 118 is included for each media stream sample in the time-stamped packet 108. In a fourth example, the SYT_INTERVAL 550 may not be determined or used.

When the header engine 302 populates the stream ID 204 in the header cache 530, the state machine 510 may assert the lookup signal 446 and provide the stream ID 204 to the stream ID filter 304 as described above in reference to FIG. 4. The header engine 302 may receive the success 440 signal from the stream ID filter 304 indicating that the stream ID 204 is a subscribed one.

The stream ID filter 304 may take time to complete the lookup. During that time, the header engine 302 may start receiving the payload data 312 in the client data 570. Therefore, the delay component 540 may delay the payload data 312 before the header engine 302 provides the payload data 312 to the media interface 312. For example, 16 to 32 cycle delay shift registers or other pipeline registers 560 may delay the payload data 312 so that the stream ID filter 304 has more time to perform the lookup if collisions occur. Any number of cycles may be used as the delay. The state machine 510 may assert a payload now flag 574 once the client data 570 includes the media stream samples 208. Therefore, the delay component 540 may delay the payload now flag 574 along with the payload data 312. As a result, when the media interface 112 receives the payload now flag 574, the payload now flag 574 may properly indicates that the payload data 312 is available.

In addition, the header engine 302 may generate signals that indicate which block or blocks in the time-stamped packet 108 includes the timestamp 118. In one example, mod 8, mod 16, and mod 32 signals available in Xilinx FPGAs from Xilinx™ may be used for these signals.

The header engine 302 may include additional, fewer, or different components. For example, a component other than the header engine 302 may include the delay component 540.

4. Microcode Engine.

Figure 6:
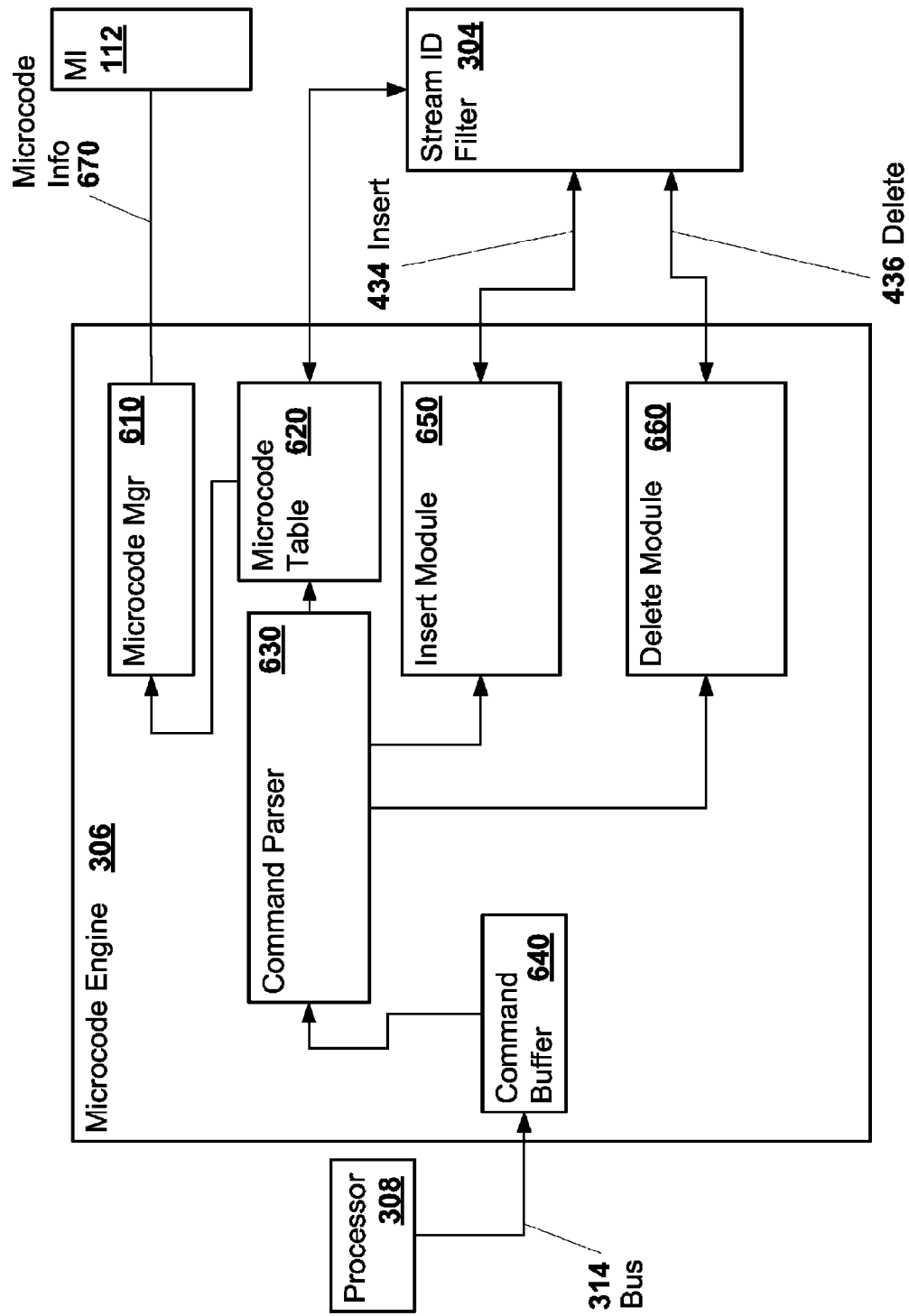
FIG. 6 illustrates an example of a microcode engine.

FIG. 6 illustrates an example of the microcode engine 306. As described above, the microcode engine 306 may be programmed by an external source, such as the processor 308, by receiving commands over the bus 314. The commands—or microcode—may describe how to process and route incoming media streams. The commands may be executed completely or partially by the microcode engine 306. The microcode engine 306 may include a microcode manager 610, a microcode table 620, a command parser 630, a command buffer 640, an insert module 650, and a delete module 660.

The command buffer 640 may include a component to temporarily store commands received over the bus 314. For example, the command buffer 640 may include a FIFO (first in first out) buffer or any other type of memory.

The command parser 630 may include a component that reads commands from the command buffer 640 and determines where to store or write the commands. For example, the command parser 630 may include a digital circuit that reads each command and determines where to store or write the command based on the type of the command.

The microcode table 620 may include memory to store commands that correspond to subscribed media stream IDs. For example, the microcode table 620 may be a block of memory sized as a function of the number of local media streams that the receiver 104 is capable of supporting.

The microcode manager 610 may include a component that reads commands from the microcode table 620 and executes the commands. For example, the microcode manager 610 may include a digital circuit embodied with logic to read and execute commands. In one example, the microcode manager 610 may include a processor, such as the processor 308 in the receiver 104.

The insert module 650 may include a component that inserts or adds a stream ID 204 to the stream ID filter 304. For example, the insert module 650 may include a finite state machine that reads two 32-bit values and writes the two values as one 64-bit word to the stream ID filter 304.

Similarly, the delete module 660 may include a component that deletes a stream ID 204 from the stream ID filter 304. For example, the delete module 660 may include a finite state machine that reads two 32-bit values and provides the two values as one 64-bit word to the stream ID filter 304 for deletion.

During operation of the microcode engine 306, the processor 308 or some other external source may populate the command buffer 640 with one or more commands. For example, a computer may generate a user interface through which a user may subscribe to the source media stream 120. The processor 308 may generate the commands in response to receipt of user input from a user input device. Alternatively or in addition, the processor 308 may write the commands to the command buffer 640 over the bus 314.

The command parser 630 may read commands or parts of commands from the command buffer 640 to determine the type of command. Table 1 below describes different types of commands implemented in one example of the AVPM system 100.

TABLE 1

| Name | Bits | Data |
| --- | --- | --- |
| ADD_STREAM_ID_UPPER | [31:0] | Stream ID (upper 4 bytes) |
| ADD_STREAM_ID_LOWER | [31:0] | Stream ID (lower 4 bytes) |
| TABLE_OFFSET | [10:0] | Table offset into Microcode Table |
| STREAM_INFO | [24:16] | Stream index |
|  | [7:0] | Media Interface Identifier |
| LOOP | [15:0] | Number of commands that follow |
| ROUTE | [31] | Route/NO OP flag |
|  | [8:0] | Channel Offset Value |
| DEL_STREAM_ID_UPPER | [31:0] | Stream ID (upper 4 bytes) |
| DEL_STREAM_ID_LOWER | [31:0] | Stream ID (lower 4 bytes) |
| USE_FIFO_LEVEL | [8] | User FIFO level flag |
|  | [7:0] | Media Interface Identifier |

Each command may include a 4-bit type field and 32-bits of data. The 4-bit type field may be stored, for example, in the parity fields of the microcode table 620 associated with the 32-bits of data. Alternatively, the commands may be of any size and stored in any suitable format. Each command may be executed upon packet reception or at some other time. For example, the ROUTE command may be executed when a time-stamped packet 108 for corresponding subscribed media stream is received in order to route the packet 108. In contrast, the ADD_STREAM_ID_UPPER and ADD_STREAM_ID_LOWER commands may be executed when the command parser 630 reads the commands from the command buffer 640. The data column in Table 1 identifies parameters of the commands.

One or more sets of commands may be issued together and in order. For example, to add a new stream, the following commands may be written to the command buffer in the following order: ADD_STREAM_ID_UPPER, ADD_STREAM_ID_LOWER, TABLE_OFFSET, STREAM_INFO, LOOP and at least one ROUTE command. To update a stream, the following commands may be written to the command buffer in the following order: TABLE_OFFSET, STREAM_INFO, LOOP, and at least one ROUTE command.

Executing a combination of the ADD_STREAM_ID_UPPER and ADD_STREAM_ID_LOWER commands together may subscribe the receiver 104 to the stream ID 204 identified by a combination of the bytes passed in both commands. The ADD_STREAM_ID_UPPER may include the upper bytes of the stream ID 204 as a parameter. The ADD_STREAM_ID_LOWER may include the lower bytes of the stream ID 204 as a parameter. Upon identifying the add stream commands, the command parser 630 may send the lower and upper portions of the stream ID 204 to the insert module 650. In response, the insert module 650 may pass the whole stream ID 204 to the stream ID filter 304 along with the insert signal 434.

The TABLE_OFFSET command may identify the offset 432 into the microcode table 620 at which commands for a particular subscribed media stream ID 438 are stored. The microcode engine 306 may pair one of the subscribed media stream identifiers stored in the stream ID filter 304 with the offset 432 so that the microcode engine 306 may begin processing the commands when the media stream samples 208 of the subscribed media stream ID 438 are available to the media interfaces. The TABLE_OFFSET command may include a parameter that identifies the offset 432. Alternatively or in addition, the TABLE_OFFSET command may include a parameter that identifies the subscribed media stream ID 438. Alternatively or in addition, the TABLE_OFFSET command may follow one or more commands that identify the subscribed media stream ID 438. For example, the TABLE_OFFSET command may follow the add stream commands in the command buffer 640, in the microcode table 620, or in both. As a result, the microcode engine 306 may derive the subscribed media stream ID 438 from the parameters of the add stream commands. If the stream ID filter 304 is to store the offset 432 in the microcode offset table 430, then the command parser 630 or the insert module 650 may transmit the offset 432 and the subscribed media stream ID 438 to the stream ID filter 304.

The STREAM_INFO command may identify which one of the media interfaces is to receive packets for a particular subscribed media stream. In addition, the STREAM_INFO command may identify the stream index 448 associated with the particular subscribed media stream. As described above, the stream index 448 may include any value that may be used to look up an item in a table, where the value may be less than or equal to the maximum number of subscribed media stream identifiers.

The STREAM_INFO command may include the stream index 448 and a media interface identifier as parameters. The media interface identifier may uniquely identify the media interface 112 among multiple media interfaces in the receiver 104. For example, the media interface identifier may include an eight-bit number or a number of a different size. Because instantiation of media interfaces may be a hardware operation, the maximum number of media interfaces supported by the receiver 104 may be specified and built into the hardware via a parameter. Each media interface 112 in the receiver 104 may be assigned a corresponding media interface identifier at build time. For example, the media interface identifier may be a zero-based index value ranging from zero to 63. The zero-based index may be different than other indexes used in the system 100. When the receiver 104 unsubscribes all stream identifiers assigned to the media interface identifier, then the media interface identifier may be recycled and used again as long as the media interface identifier is different than other media interface identifiers currently assigned to media interfaces.

The STREAM_INFO command may include a parameter that identifies the subscribed media stream ID 438. Alternatively or in addition, the STREAM_INFO command may follow the add stream commands in the command buffer 640, in the microcode table 620, or in both. As a result, the microcode manager 610 may derive the subscribed media stream ID 438 from the parameters of the add stream commands or from other commands preceding the STREAM_INFO command.

The LOOP command may provide a looping mechanism for data routing. Because each time-stamped packet 108 may include multiple media stream samples 208 or data blocks for one or more channels, the LOOP command may indicate to the microcode engine 306 how many channels are in the data blocks. The number of data blocks in each time-stamped packet 108 may be calculated from the header information 310, for example. Alternatively or in addition, the LOOP command may include a parameter that indicates the number of data blocks in each time-stamped packet 108. The LOOP command may include a parameter that indicates the number of commands that follow the LOOP command. For example, the LOOP command may indicate how many ROUTE commands follow the LOOP command in the command buffer 640, the microcode table 620, or both. The microcode manager 610 may execute all of the commands in the loop in order to process a data block in the time-stamped packet 108. The microcode manager 610 may re-execute the commands in the loop for each additional data block in the time-stamped packet 108. Alternatively or in addition, the microcode manager 610 may execute all of the commands in the loop once in order to process one entire time-stamped packet. Alternatively, the microcode manager 610 may execute a subset of the commands in the loop in order to process each data block within the time-stamped packet or the entire time-stamped packet.

The ROUTE command may include routing information for one of the media stream samples 208 in the time-stamped packet 108. One or more ROUTE commands may follow the LOOP command. For example, one ROUTE command for each media stream or channel included in the time-stamped packet 108 may be included after the LOOP command. When processing the ROUTE command, the microcode manager 610 may route one of the media stream samples 208 to the appropriate channel of the appropriate media interface. For example, the ROUTE command may include a channel offset value that identifies the memory location within an output block that corresponds to the appropriate channel. The media interface identifier in the STREAM_INFO command that precedes the LOOP command containing the ROUTE command may identify the appropriate media interface 112. Alternatively or in addition, the ROUTE command may include the media interface identifier. The ROUTE command may include a route/NO OP flag that indicates whether the microcode manager 610 should route the media stream sample or whether to ignore the ROUTE command The route/NO OP flag may be useful to selectively ignore channels.

In one example, the microcode manager 610 may transmit a write select to the media interfaces according to the value of the media interface identifier. The write select may be a bus as wide as the number of media interfaces. In other words, the bus may be a one-hot write select for the media interfaces. Each media interface 112 may be assigned one bit of the bus that is a write enable bit. When the bit is active, the corresponding media interface 112 may process the media stream sample in the payload data 312. When the bit is inactive, the corresponding media interface 112 may ignore the media stream sample.

The DEL_STREAM_ID_UPPER and DEL_STREAM_ID_LOWER commands together may unsubscribe the stream ID 204 identified by the combination of the bytes passed in both commands. Upon identifying the delete stream commands, the command parser 630 may transmit the lower and upper portions of the stream ID 204 to the delete module 660. In response, the delete module 660 may pass the whole stream ID 204 to the stream ID filter 304 along with the delete signal 436.

The USE_FIFO_LEVEL command is an optional command that may change the way the media interface 112 transmits data to the physical media interface 114. The USE_FIFO_LEVEL command may include a parameter that includes the media interface identifier. By default, the media interface 112 may transmit data in the local media stream 122 to the physical media interface 114 according to the timestamp 118 included in the time-stamped packet 108. The USE_FIFO_LEVEL command may instruct the MMU 316 to use a predetermined or hard-coded output block and/or the channel offset value for the media stream samples 208 instead of trying to determine the output block and the channel offset value. The USE_FIFO_LEVEL command may be useful if there is a problem in the MMU calculations and/or if the timestamps being received from the transmitter 102 are incorrect.

The USE_FIFO_LEVEL command may include a useFIFOLevel flag that indicates which way the identified media interface is to transmit data. For example, if the user FIFOLevel flag is not set, then the media interface 112 may transmit data to the physical media interface 114 in the order indicated by the timestamps associated with the media stream samples 208. The microcode manager 610 may transmit an appropriate signal or otherwise indicate to the identified media interface which way the identified media interface is to transmit data. The USE_FIFO_LEVEL may be used at any time, but the change may not affect the local media streams unless the streams are deleted and added again. The reason is that, in one example, the media interface 112 may calculate new channel offset values for the media streams assigned to the media interface 112 when a new media stream is added.

In response to executing one or more commands, the microcode manager 610 may transmit microcode information 670 to one or more of the media interfaces. The microcode information 670 may include any data associated with processing one or more of the media stream samples 208 at the media interface 112. Examples of the microcode information 670 include the stream index 448, the channel offset value, the route/NO OP flag, the write select, and the useFIFOLevel flag. Accordingly, the media interfaces may receive the microcode information 670 from the microcode manager 610.

The microcode engine 306 may include fewer, additional, or different components. For example, the microcode engine 306 may not include the command buffer 640.

5. Memory Management Unit.

Figure 7:
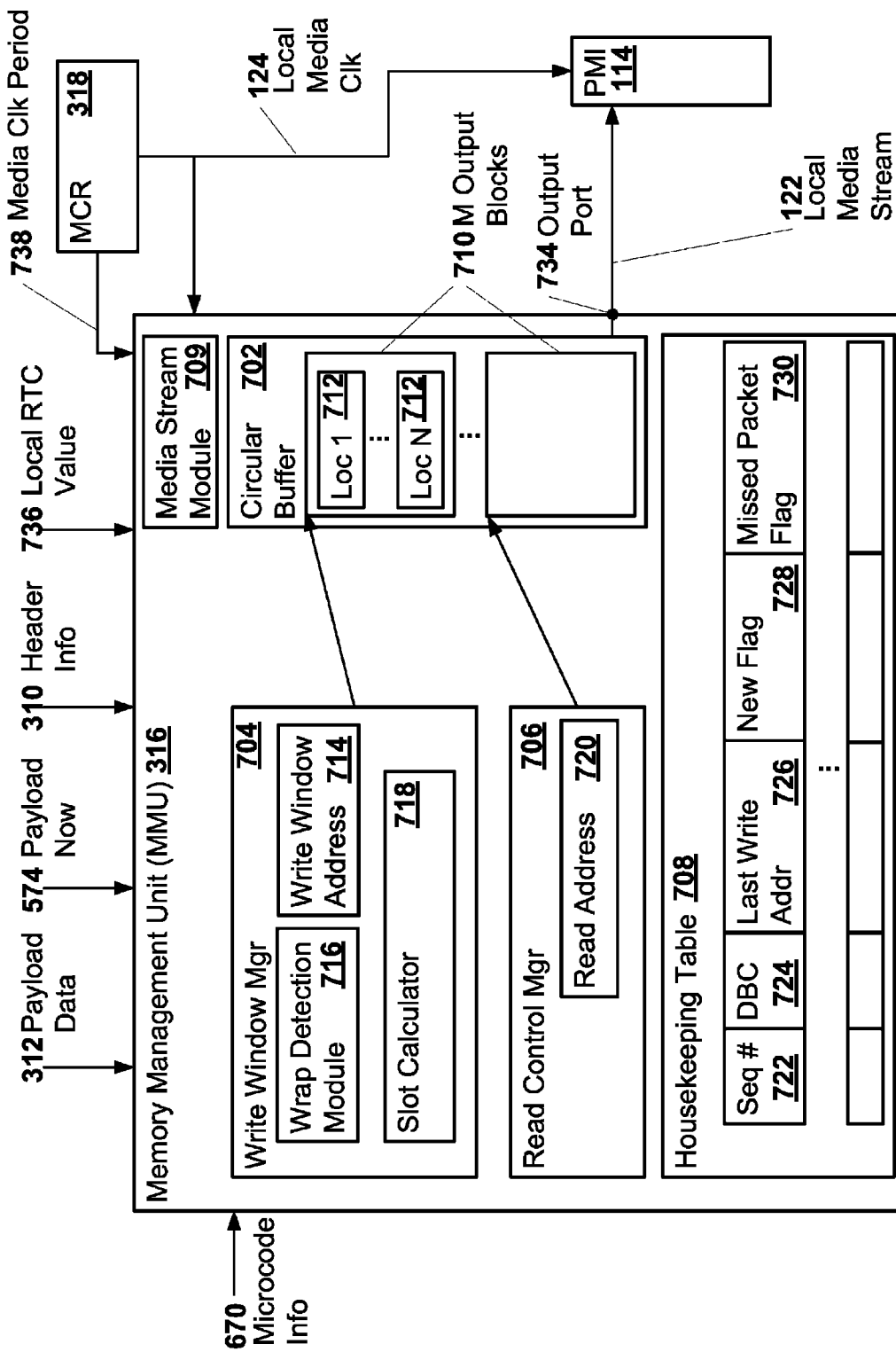
FIG. 7 illustrates an example of a memory management unit (MMU).

FIG. 7 illustrates an example of the memory management unit (MMU) 316. The MMU 316 may include a circular buffer 702, a write window manager 704, a read control manager 706, a housekeeping table 708, and a media stream module 709. The MMU 316 may implement a multiple-input chronological out (MICO) buffer. The multiple inputs of the MMU 316 may be multiple source media streams in the form of the media stream samples 208. The MMU 316 may output the local media stream 122 based on the media stream samples 208 arranged in chronological order according to timestamps associated with the media stream samples 208.

The circular buffer 702 may include a component that buffers data. For example, the circular buffer 702 may include memory, such as a dual-port random access memory (DPRAM), a random access memory (RAM), or any other writable memory. The circular buffer 702 may include M output blocks 710, where M is a positive integer. Each one of the output blocks 710 may include one or more media stream samples 208 that are to be presented at substantially the same time to the physical media interface 114. Thus, each one of the output blocks 710 may represent a time slot. Each one of the output blocks 710 may include N memory locations 712, where each one of the memory locations 712 corresponds to an output channel. Accordingly, each one of the output blocks 710 may represent a time slot for output of the N memory locations 712 of data to the physical media interface 114. Each one of the memory locations 712 may include one of the media stream samples 208.

The write window manager 704 may include a component that determines where in the circular buffer 702 to write the media stream samples 208 included in the payload data 312. The write window manager 704 may also store the media stream samples 208 in the circular buffer 702. The write window manager 704 may include a write window address 714, a wrap detection module 716, and a slot calculator 718. The write window address 714 may include an address of a target output block in the circular buffer 702 to write the media stream sample in the payload data 312. The write window address 714 may identify the output block that is to be presented to the physical media interface 114 at the time indicated in the timestamp 118. The slot calculator 718 may include a component that determines which of the output blocks 710 corresponds to the timestamp 118 associated with the first media stream sample of a particular stream ID. Alternatively or in addition, the slot calculator 718 may include a component that determines which of the output blocks 710 corresponds to the timestamp 118 associated with subsequently received media stream samples 208 of the stream ID 204. The wrap detection module 716 may include a component that determines when to wrap the write window address 714. The wrap detection module 716 may correct the write window address 714 accordingly.

The read control manager 706 may include a component that determines where in the circular buffer 702 to read from when generating the local media stream 122. The read control manager 706 may include a read address 720. The read address may be an address of the output block in the circular buffer 702 that includes one or more of the media stream samples 208 that are to be presented to the physical media interface 114 at the current time.

The housekeeping table 708 may include information about the source media streams. For example, the housekeeping table 708 may include a packet sequence number 722, the DBC (data block count) 724, a last write address 726, a new flag 728, and a missed packet flag 730 for each one of the source media streams assigned to the media interface 112. The housekeeping table 708 may be indexed using the stream index 448 received from the stream ID filter 304. Alternatively, the housekeeping table 708 may be indexed using the channel offset value received in the microcode information 670 from the microcode engine 306.

The sequence number may include a packet sequence number included in the time-stamped packet 108. The DBC 724 may indicate an ongoing count of data blocks for the media stream. For example, if the DBC 724 is 21 and the current time-stamped packet 108 includes 6 media stream samples 208, then the next time-stamped packet 108 may have a DBC 724 value of 27, which is 21 plus 6. The last write address 726 may include the address of the output block at which the last media stream sample for media stream was written. The new flag 728 may indicate whether the MMU 316 has previously processed any time-stamped packets for the media stream. For example, the new flag 728 may correspond to the new stream flag 450 generated by the stream ID filter 304 when subscribing to a particular stream ID 204. The missed packet flag 730 may indicate whether a packet in a sequence of packets for the source media stream has failed to reach the receiver 104.

The media stream module 709 may include a component that reads from the circular buffer 702 in order to generate the local media stream 122. The media stream module 709 may generate the local media stream 122 in a format that is specific to the physical media interface 114.

The AVPM system 100 may be designed with parameters that control the amount of memory used for the circular buffer 702 based on channel count and media clock frequency. As described above, the media interface 112, which includes the MMU 316, may be instantiated for each media clock domain in the system 100. In one example, the media interface 112 may be implemented as a FPGA. Because the media clock domains may be known at FPGA compile time, hardware corresponding to the media clock domains may be implemented at compile time of the FPGA. In addition, structures in the physical media interface 114, such as media stream module 709, may also be known at compile time. For similar reasons, the size of each of the output blocks 710 (output block size) may be known at compile time. Thus, the output block size may be a compile-time parameter used by the media stream module 709 or other component, such as the MMU 316. The output block size may depend on the number of channels included in the local media stream 122. The output block size may not be the same as the block size of a block of one or more media stream samples 208 in the time-stamped packet 108. The reason may be that the output block may comprise media stream samples 208 taken from multiple source media streams, the combination of which may be included in one of the output blocks 710. Alternatively, the output block size for the media interface 112 may be the same as the block size of the block of one or more media stream samples 208 in the time-stamped packet 108. Alternatively, the output block size may be smaller than the block size of a block in the time-stamped packet. For example, a NO-OP in the ROUTE command may cause one or more of the media stream samples 208 to be ignored.

When the receiver 104 subscribes to a new media stream or when the first time-stamped packet for the new media stream is received, the MMU 316 may receive the new stream flag 450 from the stream ID filter 304 as described above. In response, the MMU 316 may create an entry in the housekeeping table 708 for the subscribed media stream in a location specified by the stream index 448 or some other index, such as the stream ID index 420 or the channel offset value. The channel offset value, if used as an index into the housekeeping table 708, may be received in the microcode information 670 from the microcode engine 306. The MMU 316 may set the new flag 728 in the housekeeping table 708 for the new media stream.

The MMU 316 may manage read and write addressing and control of the circular buffer 702 for a given media clock domain. In particular, the write window manager 702 may determine write windows for the microcode-controlled writes of the payload data 312 into the circular buffer 702. The write window may include the appropriate one of the output blocks 710 containing the media stream samples 208 to be presented to the physical media interface 114 at substantially the same time. The write window may be the size of one of the media output blocks 710. The microcode information 670 received from the microcode engine 306 may include an offset into the write window for channel routing. For example, the microcode information 670 may include the channel offset value identified in the ROUTE command. The channel offset value may identify which of the memory locations 712 within an output block that is to contain the media stream sample currently in the payload data 312.

Each source media stream managed by the MMU 316 may have a corresponding write window. One reason for having different write windows for different source media streams is because the media stream samples 208 of the source media streams may be received in different time-stamped packets, each having different respective presentation times. As described above, the presentation time for a data block in the time-stamped packet 108 may be indicated by the timestamp 118 in the header information 310.

The write window manager 704 may account for the different presentation times by maintaining different write window addresses for different source media streams. For example, after the write window manager 704 initially determines the write window address 714 for one or more media stream samples 208 in the time-stamped packet 108, the write window manager 704 may store the write window address 714 in the last write address 726 for the corresponding media stream in the housekeeping table 708. Similarly, the write window manager 704 may subsequently retrieve the last write address 726 from the housekeeping table 708 instead of completely recalculating the time slot and the associated write window address 714 whenever the payload data 312 is received. The write window manager 704 may advance the last write address 726 after each block in the payload data 312 is written to the circular buffer 702. Alternatively, the write window manager 704 may advance the last write address 726 prior to each block of the payload data 312 being written to the circular buffer 702.

Each incoming channel in the payload data 312 may either be routed or dropped. By including one ROUTE command per channel, each channel is controlled separately. For example, if the No Op flag in the microcode information 670 is set for one ROUTE command but not for other ROUTE commands, then the MMU 316 may ignore the channel controlled by the one ROUTE command, but process other channels controlled by the other ROUTE commands.

The MMU 316 may process the payload data 312 when the payload now flag 574 indicates that the payload data 312 is available for processing. Alternatively or in addition, the MMU 316 may process the payload data 312 when the write select in the microcode information 670 is asserted. In one example, the MMU 316 may process the payload data 312 when both the write select and the payload now flag 574 are set.

The MMU 316 may be instructed that the incoming time-stamped packet 108 packet is the first packet of a new media stream. For example, the MMU 316 may receive the new stream flag 450 from the stream ID filter 304. In response, the write window manager 704 may determine the initial write window address 714 for the new media stream with the slot calculator 718. After determining the initial write window address 714, the write window manager 704 may unset the new flag 728 in the housekeeping table 708 for the media stream. Unsetting the new flag 728 may indicate that the media stream is an established media stream. Accordingly, the last write address 726 for the media stream may thereafter be automatically updated each time a new time-stamped packet arrives at the MMU 316.

The MMU 316 may also detect media stream disruptions and make corrections when disruptions are detected so that presentation time is maintained. To that end, the MMU 316 may extract the DBC 724, the SYT_INTERNAL 550, the packet sequence number 722, or any other packet verification information from the header information 310. The MMU 316 may compare the packet verification information with values stored the housekeeping table 708 for the media stream.

For example, the DBC 724 and packet sequence number 722 for the next expected packet may be updated in the housekeeping table 708 as the time-stamped packets are received. Whenever the DBC 724 in the housekeeping table 708 does not match the DBC 724 in the header information 310, the MMU 316 may determine that an error has been encountered. Whenever the packet sequence number 722 in the housekeeping table 708 does not immediately precede the packet sequence number 722 in the header information 310, then the MMU 316 may determine that there has been a packet loss or some other type of stream disruption. Accordingly, the MMU 316 may mark the appropriate media stream for re-computation of the write window address 714 so that the presentation time may be correctly reestablished when writing the next media stream sample for that media stream. For example, the MMU 316 may set the missed packet flag 730 to mark the appropriate media stream for re-computation of the write window address 714.

The MMU 316 may compare the write window address 714 with the read address 720 while processing each time-stamped packet 108 as a check to verify that there has been no misalignment with data in the output blocks 710. If misalignment is discovered, the MMU 316 may again mark the affected stream for re-computation of the write window address 714.

The circular buffer 702 may include a buffer in which a read or write pointer is wrapped to the beginning of the buffer when the pointer reaches the end of the buffer. The MMU 316 may advanced the write window address 714 after writing one or more of the media stream samples 208 into one of the output blocks 710. However, advancing the write window address 714 may increase the write window address 714 to an address beyond the circular buffer 702. The wrap detection module 716 may handle wrapping of the write window address 714 from the end of the circular buffer 702 to the beginning of the buffer, or vice versa. The output blocks 710 may be read from the circular buffer 702 by the media stream module 709 as if the circular buffer 702 were a FIFO buffer. The read control manager 706 may determine and manage the read address 720 used by the media stream module 709.

The initial time slot and the corresponding write window address 714 for each media stream may be determined after the local media clock 124 is synchronized with the master media clock 126. Once the initial write window address 714 is determined for the corresponding media stream, the write window address 714 may be incremented (or decremented) by the output block size after processing each incoming data block for the media stream. The difference between the write window address 714 for the media stream and the read address 720 of the media stream may indicate the amount of buffering to be used for that stream until the presentation of the incoming data block.

The slot calculator 718 may determine the initial write window address 714 using the current read address 720, the local RTC value 736 read from the RTC 116 when the current read address 720 was determined, and the presentation time of the incoming block of data. The presentation time of the incoming block of data may be the timestamp 118 in the header information 310 or a value derived therefrom. The time difference between the local RTC value 736 and the presentation time of the incoming block of data may indicate the amount of buffer time that the incoming block of data is to be buffered before being read from the circular buffer 702. The amount of buffer time may be divided by the media clock period 738 and the result rounded up to the next integer. The rounded result may be an integer, Q, that indicates how many output blocks 710 away from the current output block that the data should be written. The current output block may be at the current read address 720. The MCR 318 may determine and provide the media clock period 738 or average media clock period to the MMU 316. Thus, the write window address 714 may be equal to the current read address 720 minus the size of the output block times the integer Q. The wrap detection module 716 may adjust the write window address 714 accordingly.

The MMU 316 may also generate and update the read address 720 over time. The read control manager 706 may increment the read address 720 by the size of the output block on each cycle of the local media clock 124. Alternatively, instead of incrementing the read address 720, the read control manager 706 may decrement the read address 720 by the size of the output block. The media stream module 709 may access individual output channels by adding or subtracting an offset to the read address 720. The offset may be determined from, for example, the channel offset value included in the microcode information 670. The media stream module 709 may read data from each of the memory locations 712 of the current output block at a suitable clock rate until the entire output block is read. For example, the suitable clock rate may be the number of channels multiplied by the rate of the local media clock 124.

In one example, the physical media interface 114 or the consumer device coupled to the physical media interface 114 may not utilize the read address 720 to read the appropriate one of the output blocks 710. Instead, the media stream module 709 may read the data from the output block identified by the read address 720, and output the data to an output port 734 of the MMU 316. Then, physical media interface 114 or the consumer device coupled to the physical media interface 114 may read the local media stream 122 from the output port 734. Thus, physical media interface 114 or the consumer device coupled to the physical media interface 114 may read the data in the circular buffer 702 through the output port 734 as a FIFO buffer, by requesting the next block of data for each cycle of the local media clock 124. Where the circular buffer 702 is a dual-port memory, the MMU 316 may write the circular buffer 702 on one port at substantially the same time that data is read from the circular buffer 702 on another port.

The MMU 316 may include additional, fewer, or different components. For example, the MMU 316 may not include the circular buffer 702, which may be included elsewhere in the media interface 112.

The components of the MMU 316 may include fewer, additional or different components. For example, the housekeeping table 708 may include a next write address instead of the last write address 726. In another example, the housekeeping table 708 may include the SYT_INTERVAL 550. In yet another example, the wrap detection module 716 may be included outside of the write window manager 704, but inside the MMU 316.

Figure 8:
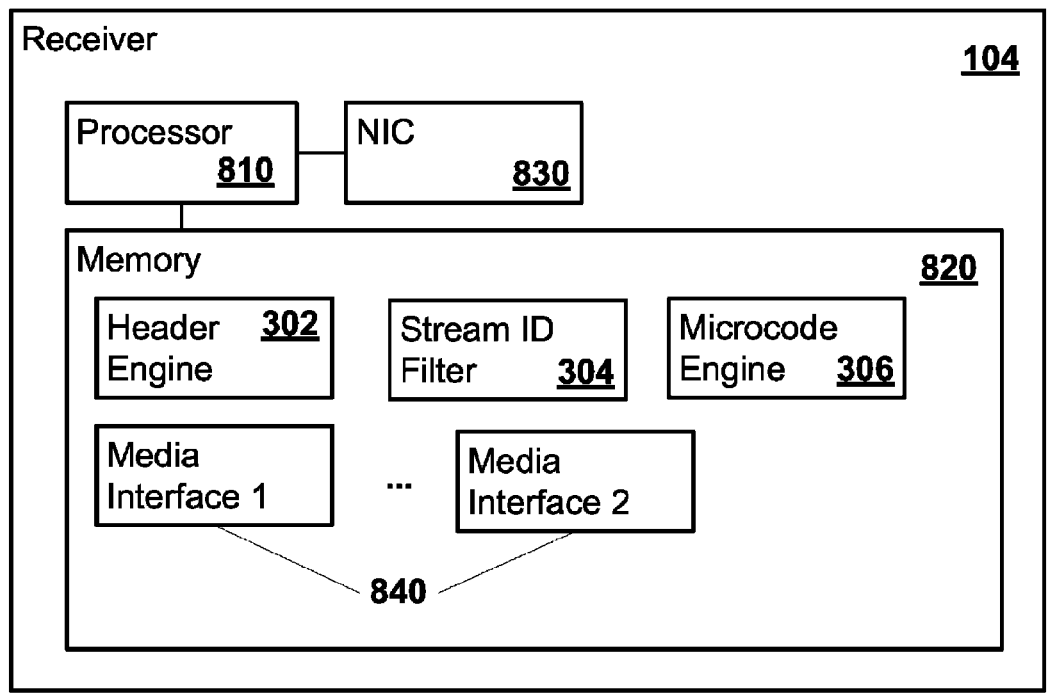
FIG. 8 illustrates an example of a hardware diagram of a receiver.

FIG. 8 illustrates an example of a hardware diagram of the receiver 104. The receiver 104 may include a processor 810, a memory 820, and the network interface controller (NIC) 830. The processor 810 may be in communication with the memory 820 and the NIC. Alternatively or in addition, the processor 810 may be in communication with other components such as a display device (not shown) and a user input device (not shown).

The memory 820 may be a data storage device or combination of data storage devices. The memory 820 may include non-volatile and/or volatile memory, such as a random access memory (RAM), a read-only memory (ROM), an erasable programmable read-only memory (EPROM), flash memory, any other type of computer readable media, or any combination thereof. Alternatively or in addition, the memory 820 may include an optical, magnetic (hard-drive) or any other form of data storage device.

The processor 810 may be any hardware component that executes computer readable instructions. For example, the processor 704 may be a microcontroller, a soft core processor, an ASIC (application-specific integrated circuit), an FPGA (field programmable gate array), a CPLD (complex programmable logic device), a central processing unit of a computing device, a general processor, a digital signal processor, a digital circuit, an analog circuit, or any combination thereof.

The memory 820 may include computer code. The computer code may include instructions executable with the processor 810. The computer code may be written in any computer language now known or later discovered, such as a hardware description language (HDL), C++, C#, Java, Pascal, Visual Basic, Perl, HyperText Markup Language (HTML), JavaScript, assembly language, and any combination of computer languages. The computer code may include source code and/or compiled code.

The memory 820 may store program logic that implements the header engine 302, the stream ID filter 304, the microcode engine 306, the media interfaces 804, or any other component of the receiver 104.

The AVPM system 100, including the receiver 104 in particular, may be implemented in many different ways. For example, although some features are shown stored in the computer-readable memory 820 (e.g., as logic implemented as computer-executable instructions or as data structures in memory), all or part of the AVPM system 100 may be stored on, distributed across, or read from the memory 820 or some other machine-readable media. The computer-readable media may include RAM, an optical storage device, a magnetic storage device, a hard disk, a floppy disk, a CD-ROM, a solid state memory device, or any other form of tangible storage device. Alternatively or in addition, all or part of the receiver 104 may be implemented in one or more circuits or FPGAs.

The processing capability of the AVPM system 100 and the receiver 104 may be distributed among multiple entity or nodes, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (e.g., a dynamic link library (DLL)). The DLL, for example, may store code that calculates an average of the media clock period 738. As another example, the DLL may itself provide a portion of the functionality of the AVPM system 100, the receiver 104, or both.

Figure 9:
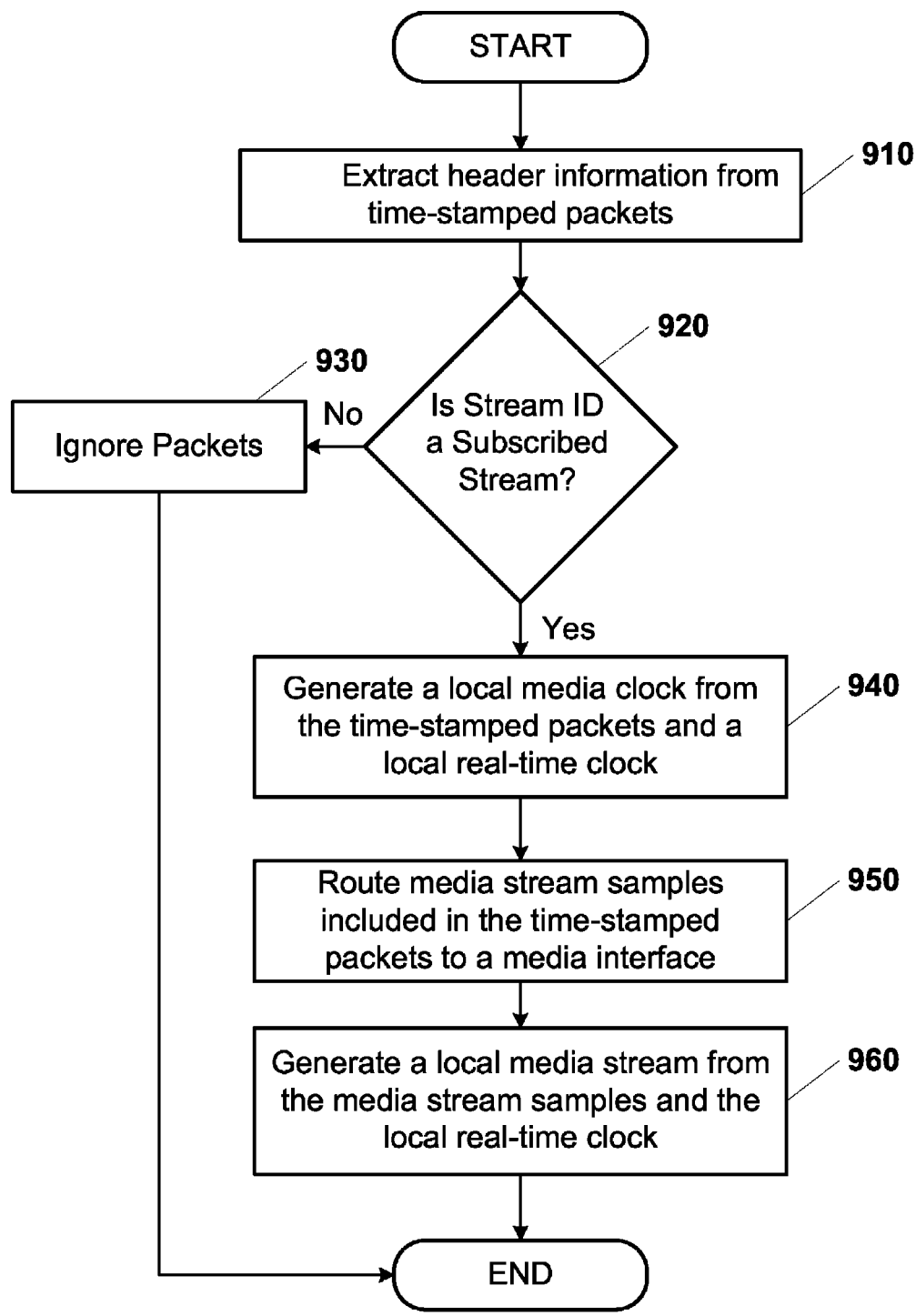
FIG. 9 illustrates an example flow diagram of the logic of a receiver.

FIG. 9 illustrates an example flow diagram of the logic of the receiver 104. The logic may include additional, different, or fewer operations. The operations may be executed in a different order than illustrated in FIG. 9.

The operations may begin with the header information 310 being extracted from the time-stamped packets 108 (910). The header information 310 may include the stream ID 204.

The stream ID 204 in the header information 310 may be checked to see if the stream ID 204 corresponds to a subscribed media stream (920). If not, then the time-stamped packets for the stream ID 204 may be ignored (930).

Alternatively, if the stream ID 204 corresponds to a subscribed media stream, then the local media clock 124 may be generated from the time-stamped packets and from the RTC 116 at the receiver 104 (940). For example, the media clock recovery component 318 may generate the local media clock 124 and synchronize the local media clock 124 with the master media clock 126. However, the local media clock 124 may be generated from a subset of the subscribed media streams. For example, just one subscribed stream may be used to recover the local media clock 124 for a single clock domain shared by multiple subscribed streams. Indeed, the local media clock 124 may even be generated from one of the media stream that is not one of the subscribed media streams. The media stream samples 208 may be routed to the assigned media interface 112 in response to a determination that the media stream samples 208 are for at least one subscribed media stream (950). The assigned media interface 112 may generate the local media stream 122 from the media stream samples 208 and the RTC 116 at the receiver 104 (960).

The operations may end or the operations may repeat to continually generate the local media stream or streams.

Figure 10:
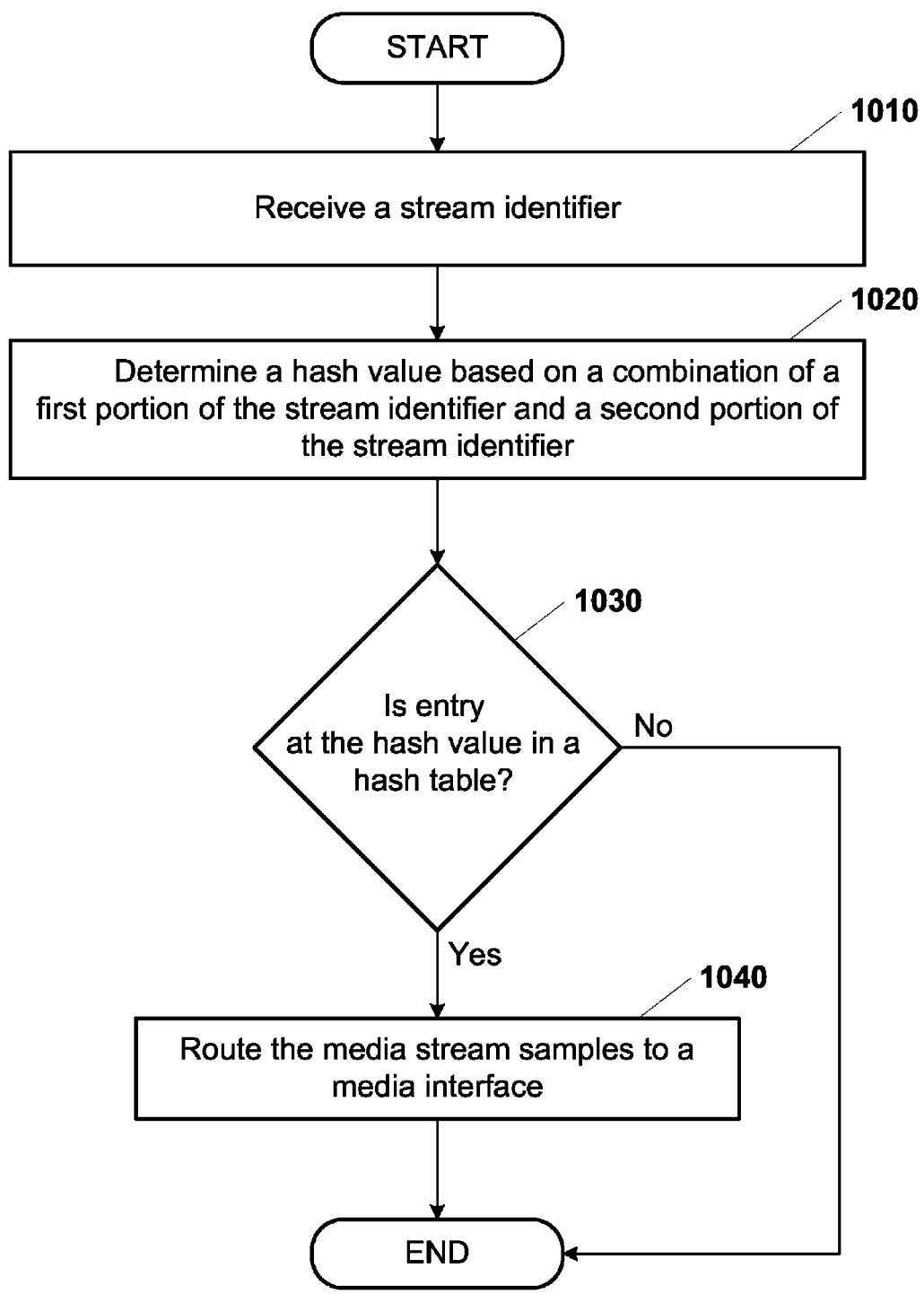
FIG. 10 illustrates an example flow diagram of the logic of routing the media stream samples in the receiver.

FIG. 10 illustrates an example flow diagram of the logic of routing the media stream samples 208 in the receiver 104. The logic may include additional, different, or fewer operations. The operations may be executed in a different order than illustrated in FIG. 10.

The operations may begin with receiving the stream ID 204 that identifies the source media stream 120 that corresponds to the media stream samples 208 (1010). For example, the stream ID 204 may be received from a component such as the header engine 302.

The operations may continue by determining a hash value based on a combination of a first portion of the stream ID 204 and a second portion of the stream ID 204 (1020). For example, the most significant four bytes of the stream ID 204 may be XORed with the least significant four bytes of the stream ID 204, and the hash value, such as the stream ID index 420, being determined as the result of the XOR operation modulo the size of the stream ID table 410.

The stream ID 204 may be determined to identify a subscribed media stream by looking up the hash value in a hash table (1030). For example, if the hash table is empty at the hash value, then the stream ID 204 may be determined not to be a subscribed media stream. The operations may end by ignoring the media stream samples 208. Alternatively, if an entry at the hash value in the hash table matches the stream ID 204, for example, then the stream ID 204 may be determined to identify a subscribed media stream.

The operations may continue by routing the media stream samples 208 to the media interface 112 in response to a determination that the stream ID 204 identifies the subscribed media stream (1040). The operations may end, or alternatively, repeat the operations by, for example, receiving the stream ID 204 again (1010).

Figure 11:
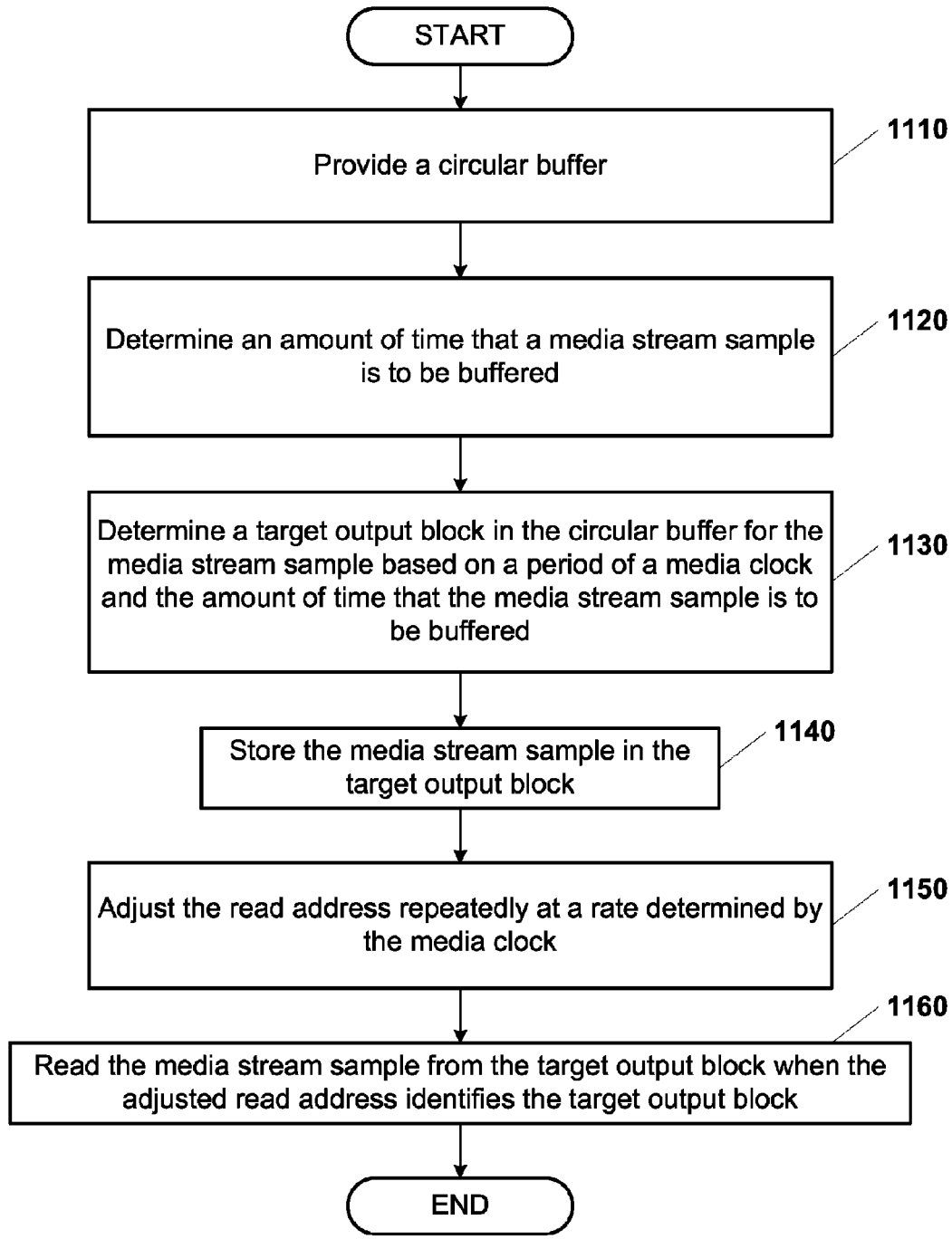
FIG. 11 illustrates an example flow diagram of the logic of the memory management unit.

FIG. 11 illustrates an example flow diagram of the logic of the memory management unit 316. The logic may include additional, different, or fewer operations. The operations may be executed in a different order than illustrated in FIG. 11.

The operations may begin with the circular buffer 702 being provided in the memory 820, where the circular buffer 702 includes output blocks 710 that each correspond to a respective timeslot (1110).

The operations may continue with the amount of time that a media stream sample is to be buffered being determined based on the local RTC value 736 relative to the timestamp 118 associated with the media stream sample (1120). For example, the local RTC value 736 may be subtracted from the timestamp 118.

The operations may continue with a target output block in the circular buffer 702 being determined for the media stream sample based on the media clock period 738 and the amount of time that the media stream sample is to be buffered (1130). The target output block may be determined relative to an output block identified by the read address 720. The media stream sample may be stored in the target output block (1140).

The operation may continue with the read address 720 being adjusted to identify a next one of the output blocks 710 repeatedly at a rate determined by the local media clock 124 (1150). For example, the read address 720 may be incremented by the size of each of the output blocks 710 on a leading edge of the local media clock 124. Thus, the media stream sample may be read from the target output block when the adjusted read address identifies the target output block. The operation may end or continue by repeatedly storing additional media stream samples 208 in the output blocks 710, and reading the additional media stream samples 208 from the output blocks 710 in accordance with the local media clock 124.

Although specific components of innovations were described, methods, systems, and articles of manufacture consistent with the innovation may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, tables, entities, and other data structures may be separately stored and managed, may be incorporated into a single memory or database, may be distributed, or may be logically and physically organized in many different ways. The components may be included on non-transitory computer readable media encoded with computer readable instructions. The components may operate independently or be part of a same program. The components may be resident on separate hardware, such as separate removable circuit boards, or share common hardware, such as a same memory and processor for implementing instructions from the memory. Programs may be parts of a single program, separate programs, or distributed across several memories and processors.

The respective logic, software or instructions for implementing the processes, methods and/or techniques discussed above may be provided on computer-readable media or memories or other tangible media, such as a cache, buffer, RAM, removable media, hard drive, other computer readable storage media, or any other tangible media or any combination thereof. The non-transitory computer readable media include various types of volatile and nonvolatile storage media. The functions, acts or tasks illustrated in the figures or described above may be executed in response to one or more sets of logic or instructions stored in or on computer readable media. The functions, acts or tasks are independent of the particular type of instructions set, storage media, processor or processing strategy, and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

The term "audio/video" may mean audio, video, or both. Thus, in one example, "audio/video" means only audio. In a second example, "audio/video" means only video. In a third example, "audio/video" means a combination of audio and video.

While various examples of the invention have been described, it will be apparent to those of ordinary skill in the art that many more examples and implementations are possible within the scope of the invention. Accordingly, the invention is not to be restricted except in light of the attached claims and their equivalents.

We claim:

1. A system for processing media stream samples in time-stamped packets received over a network, the system comprising:
    a memory comprising a hash table for distinguishing between subscribed and non-subscribed media streams;
    a stream identifier filter configured to receive a stream identifier that identifies a source media stream corresponding to the media stream samples, the stream identifier filter comprising a mixer and a scrambler, the mixer configured to rearrange an order of bits within the stream identifier to form mixed portions of the stream identifier, the scrambler configured to produce a pseudorandom value from a seed value, the seed value based on a first mixed portion of the stream identifier, where the stream identifier filter is further configured to determine a hash value based on the pseudorandom value and a second mixed portion of the stream identifier, and where the stream identifier filter is further configured to determine that the stream identifier identifies a subscribed media stream based on a lookup of the hash value in the hash table; and
    a microcode engine configured to route the media stream samples to a media interface in response to a determination by the stream identifier filter that the stream identifier identifies the subscribed media stream.

2. The system of claim 1, where the hash value is based on a logical exclusive OR of the pseudorandom value with a value that is based on the second mixed portion of the stream identifier.

3. The system of claim 1, where the hash value is based on a logical exclusive OR of the pseudorandom value and a value based on the second mixed portion of the stream identifier.

4. The system of claim 1, where the time-stamped packets include IEEE (Institute of Electrical and Electronics Engineers) P1722 packets.

5. The system of claim 1, where the stream identifier filter determines the hash value based on a logical AND of the number of entries in the hash table minus one with a combination of the pseudorandom value and a value that is based on the second mixed portion of the stream identifier.

6. The system of claim 1, where the hash value equals a combination of the pseudorandom value and a value that is based on the second mixed portion of the stream identifier modulo a number of entries in the hash table.

7. The system of claim 1, where the size of the hash table is less than or equal to twice the maximum number of subscribed media streams, and the size of the stream identifier is at least 64 bits.

8. A tangible non-transitory computer readable medium encoded with computer executable instructions, the computer executable instructions executable with a processor, the tangible non-transitory computer readable medium comprising:
    instructions executable to receive a stream identifier that identifies a source media stream for media stream samples that are included in time-stamped packets;
    instructions executable to rearrange an order of bits of the stream identifier to form mixed portions of the stream identifier;
    instructions executable to produce a pseudorandom value from a seed value, the seed value based on a first mixed portion of the stream identifier;
    instructions executable to determine a hash value based on the pseudorandom value and a second mixed portion of the stream identifier;
    instructions executable to determine that the stream identifier identifies a subscribed media stream based on a lookup of the hash value in a hash table; and
    instructions executable to route the media stream samples to a media interface in response to a determination that the stream identifier identifies the subscribed media stream.

9. The computer readable medium of claim 8 further comprising instructions executable to subscribe to the stream identifier through receipt of at least one route command for the stream identifier over a bus.

10. The computer readable medium of claim 8 further comprising instructions executable to direct the media interface to process the media stream samples based on the media interface being associated with the stream identifier.

11. The computer readable medium of claim 8 further comprising instructions executable to provide the media stream interface a channel offset value that identifies a channel for the media stream samples, the channel offset value being retrieved from a second hash table at a location identified by the hash value.

12. The computer readable medium of claim 8 further comprising instructions executable to process a route command in response to the determination that the stream identifier identifies the subscribed media stream.

13. The computer readable medium of claim 12 further comprising instructions executable to process the route command for each respective one of the media stream samples.

14. A method for processing media stream samples included in time-stamped packets that are received over a network, the method comprising:
    receiving a stream identifier that identifies a source media stream corresponding to the media stream samples;
    forming mixed portions of the stream identifier by rearranging bits within the stream identifier;
    producing a pseudorandom value from a seed value, the seed value based on a first mixed portion of the stream identifier;
    determining a hash value based on the pseudorandom value and a second mixed portion of the stream identifier;
    determining that the stream identifier identifies a subscribed media stream by looking up the hash value in a hash table; and
    routing the media stream samples to a media interface in response to a determination that the stream identifier identifies the subscribed media stream.

15. The method of claim 14, where the pseudorandom value is a first pseudorandom value, the seed value is a first seed value, where determining the hash value comprises determining the hash value from the first pseudorandom value and a second pseudorandom value, where the second pseudorandom value is produced from second seed value, and the second seed value is based on the second mixed portion of the stream identifier.

16. The method of claim 14 further comprising resolving a detected collision by generating a second hash value from one or more pseudorandom values in a sequence of pseudorandom values that includes the pseudorandom value produced from the seed value.

17. The method of claim 14, where routing the media stream samples to the media interface comprises executing a route command for each respective one of the media stream samples.

18. The method of claim 15, where determining the hash value comprises determining a hash value from a logical exclusive OR of the first pseudorandom value with the second pseudorandom value.

\* \* \* \* \*